(12) United States Patent
Eugenio et al.

(10) Patent No.: US 10,969,979 B2
(45) Date of Patent: Apr. 6, 2021

(54) INPUT/OUTPUT (I/O) LOOPBACK FUNCTION FOR I/O SIGNALING TESTING

(71) Applicant: Intel Corporation, Santa Clara, CA (US)

(72) Inventors: Dean-Dexter R. Eugenio, Folsom, CA (US); Arvind Kumar, Brookline, MA (US); John R. Goles, Folsom, CA (US); Christopher E. Cox, Placerville, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/702,359

(22) Filed: Dec. 3, 2019

(65) Prior Publication Data

US 2020/0159429 A1    May 21, 2020

Related U.S. Application Data

(63) Continuation of application No. 15/811,497, filed on Nov. 13, 2017, now Pat. No. 10,496,309.

(60) Provisional application No. 62/421,292, filed on Nov. 13, 2017.

(51) Int. Cl.
| | |
|---|---|
| *G06F 3/06* | (2006.01) |
| *G06F 13/16* | (2006.01) |
| *G06F 11/22* | (2006.01) |

(52) U.S. Cl.
CPC ............ *G06F 3/0635* (2013.01); *G06F 11/22* (2013.01); *G06F 11/221* (2013.01); *G06F 13/1673* (2013.01); *G06F 13/1689* (2013.01); *G06F 3/0679* (2013.01)

(58) Field of Classification Search
CPC ............ G06F 13/1689; G06F 13/1673; G06F 3/0635; G06F 3/0679; G06F 11/22; G06F 11/221
See application file for complete search history.

(56) References Cited

U.S. PATENT DOCUMENTS

| | | |
|---|---|---|
| 5,161,162 A | 11/1992 | Watkins et al. |
| 2005/0117908 A1* | 6/2005 | Castanon ........... H04Q 11/0005 398/85 |
| 2006/0004968 A1 | 1/2006 | Vogt |
| 2010/0251042 A1 | 9/2010 | Selking |
| 2011/0131374 A1 | 6/2011 | Noeldner et al. |
| 2011/0235459 A1* | 9/2011 | Ware ................... G11C 7/1093 365/233.11 |
| 2011/0239063 A1 | 9/2011 | Zerbe et al. |
| 2011/0283060 A1 | 11/2011 | Ware et al. |
| 2012/0159271 A1 | 6/2012 | Cho et al. |

(Continued)

OTHER PUBLICATIONS

First Office Action for U.S. Appl. No. 15/811,497, dated Jan. 11, 2019, 8 pages.

*Primary Examiner* — Nimesh G Patel
(74) *Attorney, Agent, or Firm* — Compass IP Law PC

(57) ABSTRACT

In a memory system an interface circuit includes an interface to a memory array, and to a data signal. The circuit includes loopback circuitry to enable loopback of received data signals without having to access the data from the memory array. The circuit can be part of a memory device, a register device, or a data buffer. The circuit interfaces to a memory array of a memory device, and performs loopback functions for a host controller that can test the operation of the interface.

21 Claims, 12 Drawing Sheets

(56) References Cited

U.S. PATENT DOCUMENTS

2012/0170938 A1* 7/2012 Evans .................. H04B 10/073
                                                    398/91
2019/0064265 A1* 2/2019 Wilmoth ............. G06F 11/3051

* cited by examiner

| | 1 | 2 | 3 | 4 | 5 | 6 | 7 | 8 | 9 | |
|---|---|---|---|---|---|---|---|---|---|---|
| A | NC_VSS | VSS | VDD | | | | VDD | VSS | NC_VSS | A |
| B | DQ5 | LBDQ_o | DQ1 | | | | DQ0 | DQS_c | DQ4 | B |
| C | VPP | LBDQS_o | VDDQ | | | | VDDQ | DQS_t | ZQ | C |
| D | DQ7 | VSSQ | DQ3 | | | | DQ2 | VSSQ | DQ6 | D |
| E | VSSQ | VDD | VSS | | | | VSS | VDD | VSSQ | E |
| F | VDDQ | CK1_c | CK1_t | | | | CK0_t | CK0_c | VDDQ | F |
| G | A1 | VDDQ | CS1_n | | | | CS0_n | VDDQ | A0 | G |
| H | A5 | VSSQ | A3 | | | | A2 | VSSQ | A4 | H |
| J | A9 | VSSQ | A7 | | | | A6 | VSSQ | A8 | J |
| K | MIR | VDDQ | A11 | | | | A10 | VDDQ | CA1 | K |
| L | A13 | VSSQ | RFU | | | | LBDQS_i | LBDQ_i | A12 | L |
| M | MC_VSS | VDD | ALERT_n, VMON | | | | RESET_n | VPP | NC-VSS | M |

INPUT/OUTPUT (I/O) LOOPBACK FUNCTION FOR I/O SIGNALING TESTING

PRIORITY

This application is a continuation of, and claims the benefit of priority of U.S. patent application Ser. No. 15/811,497, filed Nov. 13, 2017, now U.S. Pat. No. 10,496,309, which in turn claims the benefit of priority of U.S. Provisional Patent Application No. 62/421,292, filed Nov. 13, 2016, both of which are incorporated herein by reference in their entirety.

FIELD

Descriptions are generally related to inter-device communication, and more particular descriptions are related to a loopback function for input/output signaling testing.

BACKGROUND

Processor throughput performance continues to increase with not just faster clock speeds that allow more operations per second, but with increasing numbers of parallel cores performing operations. The increased ability of a processor to perform more operations per second puts pressure on the interfaces to get instructions and data in and out of the processor with higher throughput to utilize the processor's performance capabilities. One primary exchange for the processor is with memory, which stores data used for the execution of operations, and stores the operation results. One mechanism to continue to exchange data between the processor and the memory is to increase the clock speed of the signaling used to exchange the data.

However, at data rates greater than approximately 3200 MT/s (mega-transfers per second), signal degradation due to inter symbol interference (ISI) is expected to increase. Additionally, the data eye at memory device connectors to the data bus is expected to be closed with non-point to point, single-loading configurations. The data eye refers to average phase of the rising and falling edges of signals sent across the signal lines interconnecting the devices. The data eye should have a consistent gap where transitioning of the input/output (I/O) signaling does not occur. Closure of the data eye refers to a scenario where the timing and voltage margins are tight enough that certain interference conditions can cause inconsistency in the signaling, making the average time of rising edges so close to the average time of falling edges to be too close to correctly sample and distinguish a signal bit. Thus, the data eye can be said to be "collapsed" when signaling transitioning occurs within the space that should not have signal transitioning. Since the memory channel data bus is expected to be very reflective due to the many impedance mismatched points that exist along the memory subsystem, ISI due to reflections is expected to increase.

Traditional methods of training or characterizing an I/O interface involve sending data from the host to the memory, and then reading the data back. Traditional testing or training involved the host or a host component, such as a memory controller, issuing write commands for the data to be sent, which the memory device would then store in the memory array. The host would then issue subsequent read commands for the data, which would then have to be retrieved from the memory array. Such a loopback procedure involves significant delays each time the memory array is accessed. Additionally, such a conventional approach may require refresh of the data in the memory array.

The loopback process would typically be iterated multiple times with different phase settings (based on different settings for voltages, currents, termination, phase compensation (e.g., delay locked loops), and other settings, or a combination) until signaling settings are determined that can meet an expected bit error rate (BER). BER goals may be on the order of $10^{-16}$ or $10^{-18}$ or better. Given such error rates, it has become impractical to generate and store the required amount of data in a memory to generate the required meaningful statistical data to determine the settings needed to meet the performance requirements. Thus, traditional methods of characterizing the receiver using the data eye or the input eye mask are insufficient for upcoming signaling targets.

BRIEF DESCRIPTION OF THE DRAWINGS

The following description includes discussion of figures having illustrations given by way of example of an implementation. The drawings should be understood by way of example, and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention, and do not necessarily all refer to the same implementation. However, they are also not necessarily mutually exclusive.

Figure 1:
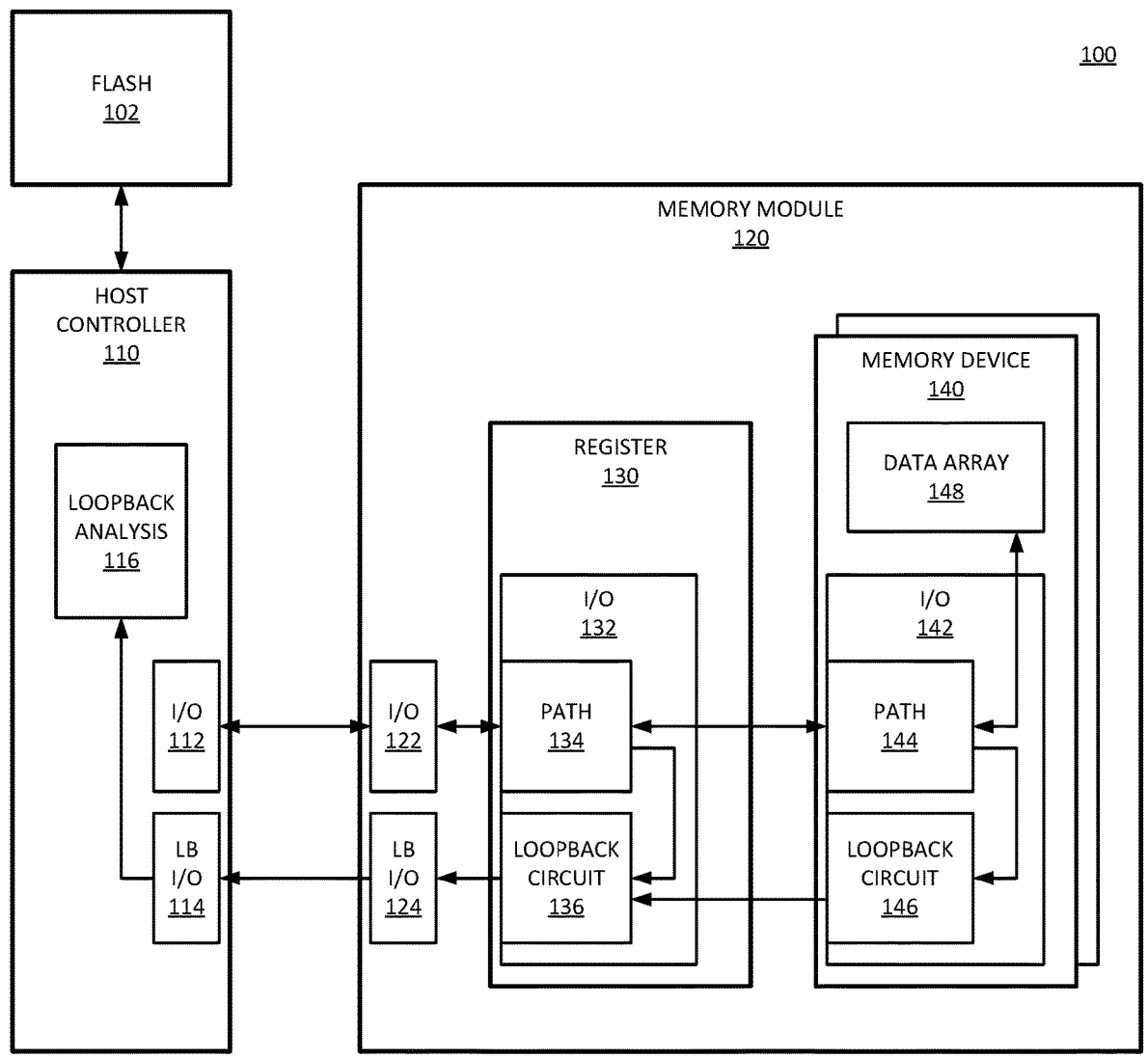
FIG. 1 is a block diagram of an example of a memory subsystem with a loopback circuit.

Descriptions of certain details and implementations follow, including non-limiting descriptions of the figures, which may depict some or all examples, and well as other potential implementations.

DETAILED DESCRIPTION

As described herein, a loopback circuit or loopback logic can be implemented in a memory device, memory module register, or a data buffer, or a combination. The loopback circuit can feed the received (Write) data back out of the device to be used by an external receiver. In a memory system an interface circuit includes an interface to a memory array, and to a data signal. Loopback circuitry or logic can enable loopback of received data signals without having to access the data from the memory array.

Loopback allows the host (memory controller or test instrument) to access and read the data for analysis immediately after the data is latched or written inside the device. For example, the data can be analyzed to determine if the received data was received correctly to be written to the memory array. In addition to, or alternatively to, performing loopback on data, an example loopback circuit can enable the analysis of internal signals generated in response to operation of other functions, such as termination, refresh timings, or other functions or operations for which a memory device may have associated timing parameters or expectations.

Inter symbol interference (ISI) is anticipated to increase at higher I/O (input/output) transfer rates, which will increase signal degradation and shrink the data eye at the memory device connector, such as a DRAM ball. The data eye can potentially close with non-point-to-point, single-loading configurations. However, traditional methods of characterizing the receiver using the input eye mask will not work, at least because memory depth in the memory device cannot store all the data samples required for meaningful statistical data to achieve bit error rates (BERs) in the range of $10^{-16}$ or $10^{-18}$. New proposals, such as emerging for double at a rate version 5 (DDR5) dynamic random access memory (DRAM) devices, implement equalization to help improve or open up the data eyes after the data is latched by the receiver.

Loopback has traditionally not been implemented in low cost commodity based DRAM devices. Historically, implementing loopback has been cost prohibitive and there was no additional requirement to measure the data eye after the data was received by the receiver. The loopback described herein can provide a view of how the data looks at different sections of equalization or post-equalization inside the memory device. In one example, a loopback mode is provided to allow stepping through all the data signal lines or DQ pins. In one example, the loopback mode can additionally step through internal routines such as DRAM write enable or internal on-die termination (ODT) enable.

Loopback can provide valuable information in a memory device for at least the following reasons. Loopback allows data written to the device to be channeled out immediately to an external receiver, which reduces the testing delays typically associated with waiting to write to, and then read from, the memory array. In one example, such a loopback enables the testing without any requirement to store the data to the memory array. Loopback allows statistical analysis at higher BER rates since the received data can be sent immediately to the test instrument, and is thus not limited to the depth of storage at the memory device. Thus, the same amount of storage space typically required to provide I/O testing is not required. In addition to what is already described, one example of loopback in accordance with what is described herein reduces execution time by removing the need to issue multiple Read commands from the memory array, and can remove the requirement for issuing and managing memory refresh commands. It will be understood that the loopback described herein can greatly increase the pattern depth possible in the testing, which in turn increases the ISI and random jitter (Rj) of the testing, allowing the receivers to be stressed sufficiently enough to cause bit errors for analysis.

FIG. 1 is a block diagram of an example of a system with a memory component loopback circuit. System 100 includes host controller 110 coupled to memory module 120. Host controller 110 can represent a memory controller of the host processor or host SOC (system on a chip). Host controller 110 can represent a controller of a test system. Thus, loopback can be implemented in production testing or in a deployed memory system, or a combination.

In one example, host controller 110 includes loopback analysis 116 to perform loopback analysis on loopback data received from a memory component. The memory component can include register 130 of memory module 120, memory device 140, or a buffer device, or other memory component, or multiple of these devices. Loopback analysis 116 can enable the host controller to evaluate the loopback data itself for signal integrity, or to evaluate the timing of the loopback signals, or the relative timing of loopback signal relative to the sending of a command, or a combination.

Host controller 110 includes I/O 112, which represents data I/O to couple with memory device 140. Host controller 110 includes I/O 114, which represents loopback (LB) I/O to receive loopback data signals. Memory module 120 can include corresponding I/O 122 and LB I/O 124. In one example, a memory component provides loopback data in response to a data signal received on I/O 122 from I/O 112.

In one implementation, system 100 includes flash device 102 or other nonvolatile storage device. In one example, flash 102 stores a basic input/output system (BIOS) for system 100. For a memory subsystem in a computing device, the BIOS can enable host controller 110 to provide testing or configuration of memory components, such as testing, initialization, or other configuration routine. For a testing device, flash 102 can represent a test program for the testing system. It will be understood that a processor device will execute the BIOS or test program, and is not explicitly illustrated in system 100. In one example, the BIOS can cause or control loopback analysis 116. In one example, the BIOS performs the analysis.

In one example, register 130 includes I/O 132, which includes path 134 to the memory array or data array 148 of memory device 140. In one example, I/O 132 includes loopback circuit 136 to provide loopback data separate from the data path to the memory array. In one example, memory device 140 includes I/O 142, which includes path 144 to data array 148. In one example, I/O 142 includes loopback circuit 146 to provide loopback data separate from the data path to the memory array. The loopback circuits of I/O 132 and I/O 142 can provide loopback in accordance with any example herein.

Figure 2:
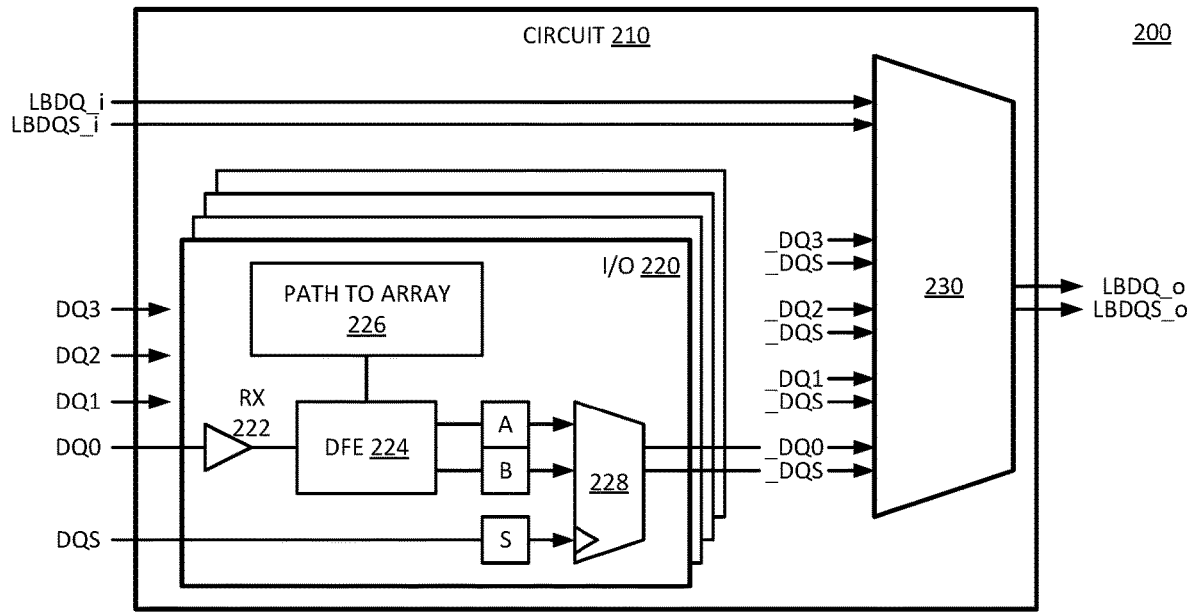
FIG. 2 is a block diagram of an example of a loopback circuit with input from an external device.

FIG. 2 is a block diagram of an example of a loopback circuit with input from an external device. System 200 provides one example of loopback logic in accordance with system 100. An example of system 200 includes circuit 210, which represents an I/O interface circuit. Circuit 210 includes I/O circuitry 220 for a data signal (DQ). System 200 illustrates an example of logic or circuitry for DQ0, and similar logic can be understood for DQ1, DQ2, and DQ3. Assuming an interface of more bandwidth than ×4, similar circuitry can be applied to all DQs of the interface. The DQS or data strobe signal can be applied to the various DQs.

In one example, I/O 220 includes receiver (RX) 222 to receive data from the signal line for DQ0. Other circuitry not shown can include driver circuitry to transmit on DQ0. I/O 220 includes path to array 226 to provide connections and circuitry to convey a data signal from DQ0 to an addressable location of the memory array. An example of I/O 220 includes DFE (decision feedback equalization) 224 or other equalization circuitry. DFE 224 represents circuitry to adjust the phase of incoming signals to adjust for phase shifting over a data burst, and thus "open" the data eye for DQ0.

An example of I/O 220 includes multiplexer (mux) 228 to receive one or more phase outputs of DFE 224. The output of mux 228 can be synchronized to the DQS signal to provide the selected output to mux 230 that can select an output to send on a feedback loop to the host controller. LBDQ_o refers to a loopback data output signal. LBDQS_o refers to a loopback data strobe output signal. As illustrated, an implementation of system 200 can provide loopback data from signals received directly at circuit 210 from a data bus (e.g., from one of DQ3:DQ0), or as passthrough data from a different component from input LBDQ_i (loopback data input) and associated LBDQS_i timing signal.

In system 200, internal DFE signals can be selected for a memory device, and the loopback circuit can also include loopback input pins from another device daisy chained to the specific memory device of system 200. Thus, in one example, an external signal from another device or test instrument can be driven to the device through the loopback input pins (LBDQS_i, LBDQ_i) and forwarded directly to a multistage mux (including mux 228 and mux 230) for loopback. The loopback output pins (LBDQS_o, LBDQ_o) enable system 200 to pass the output to a host or to a subsequent node in a daisy chain. The loopback output can couple to a previous component, or can receive the output of an equalization circuit. Different phases of DFE 224 can be selected for loopback to test various signaling parameters.

In one example, the memory device of which system 200 is a part is incorporated in a group of DRAM devices or a DIMM (dual inline memory module) having multiple DRAM devices. In one example, system 200 enables a DFE loopback within a DRAM, which can daisy chain similar signals from other DRAM devices connected on the same channel on a DIMM. Thus, the DIMM can daisy chain the DRAM loopback signal, or a data buffer loopback signal, or both, of a selected component on a rank or channel. In one example, the loopback signal can pass to a register on a DIMM. In one example, the return data path to the host controller from memory components under test, such as the DRAM devices, RCD (register clock driver), or data buffers, or a combination. The return data path can be selected by programming the register or RCD. In one example, the RCD forwards the data to the host controller or to a test point for analysis. An implementation in accordance with system 200 can reduce test time by consolidating pins and allows observability of the link at different points, including the memory channel, the DIMM connector, the DIMM PCB, or others, or a combination.

Figure 3:
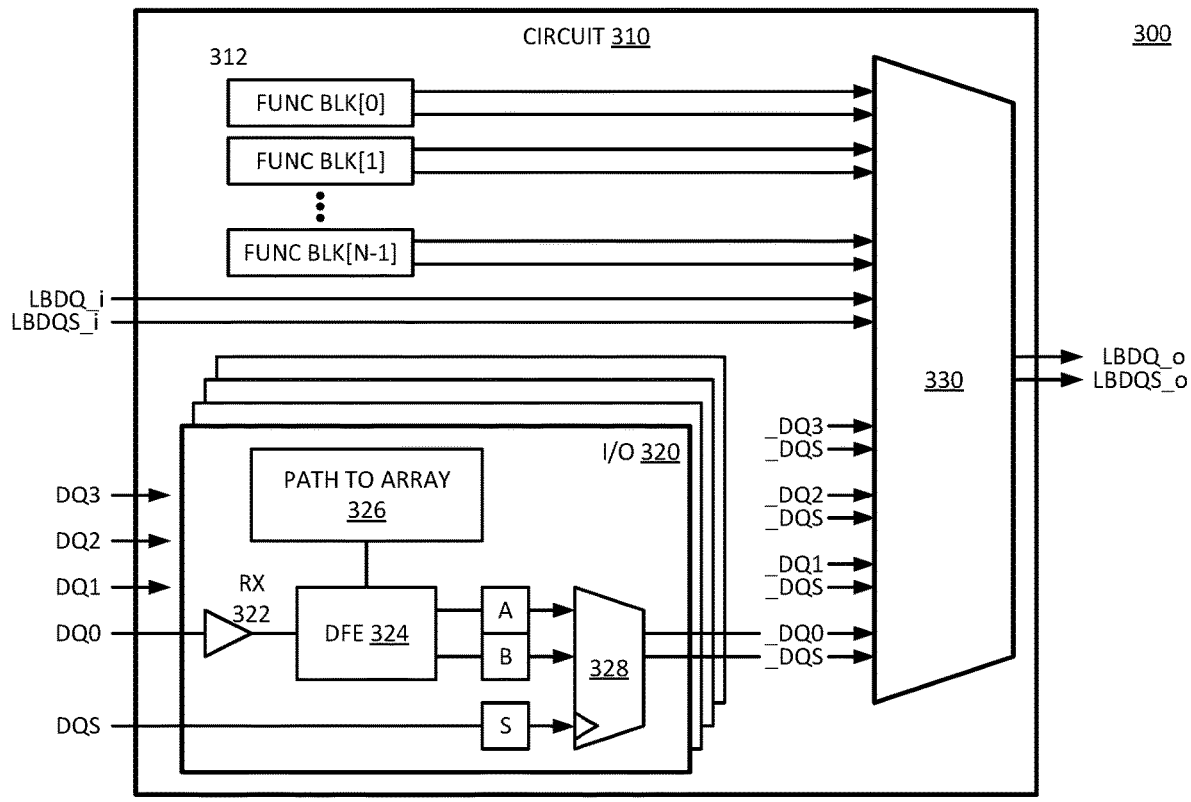
FIG. 3 is a block diagram of an example of a loopback circuit with selectable inputs from different functional blocks.

FIG. 3 is a block diagram of an example of a loopback circuit with selectable inputs from different functional blocks. System 300 provides one example of loopback logic in accordance with system 100 or with system 200, or both. An example of system 300 includes circuit 310, which represents an I/O interface circuit. Circuit 310 includes I/O circuitry 320 for a data signal (DQ). System 300 illustrates an example of logic or circuitry for DQ0, and similar logic can be understood for DQ1, DQ2, and DQ3, assuming a ×4 data bus interface. The DQS or data strobe signal can be applied to the various DQs.

In one example, I/O 320 includes receiver (RX) 322 to receive data from the signal line for DQ0. Other circuitry not shown can include driver circuitry to transmit on DQ0. I/O 320 includes path to array 326 to provide connections and circuitry to convey a data signal from DQ0 to an addressable location of the memory array. An example of I/O 320 includes DFE 324 or other equalization circuitry. In one example, system 300 includes a DFE circuit. In one example, system 300 does not include a DFE circuit.

In one example, system 300 includes N functional blocks (FUNC BLK) 312, which can be in place of or in addition to DFE circuitry. Thus, the functional block signals can be provided in parallel to signals from the data path, and provided in testing for analysis of the timing of one or more operations internal to the memory component. In one example, the output of functional blocks 312 inside the memory device can be forwarded as input to a multistage mux for loopback. The multistage mux can include mux 328 to select an equalization output, and mux 330 to select a DQ or function output. Other stages can be used. System 300 illustrates that functions in addition to or alternatively to a DFE can be employed and be monitored. Functional blocks 312 can include write leveling, internal write signals, internal refresh synchronization, self-refresh synchronization, refresh (or external or auto refresh controlled/scheduled by the memory controller) sync, test modes, ODT, or others, or a combination.

In one example, the loopback logic as described in accordance with any example described herein can enable exposing an internal signal that would normally not be exposed. Such signals can provide an indication of how many clock cycles or UIs (unit intervals) after a command from the memory controller that the memory device actually performs the function. For example, a functional block signal can indicate exactly how many clocks after a command the memory device performs an operation to trigger RTT. The timing of the triggering of RTT would be indicated based on the actual signals occurring within the memory device, and not simply by watching for a signal swing by probing a signal line or a test point. Thus, the testing can provide more accurate and complete information.

Figure 4:
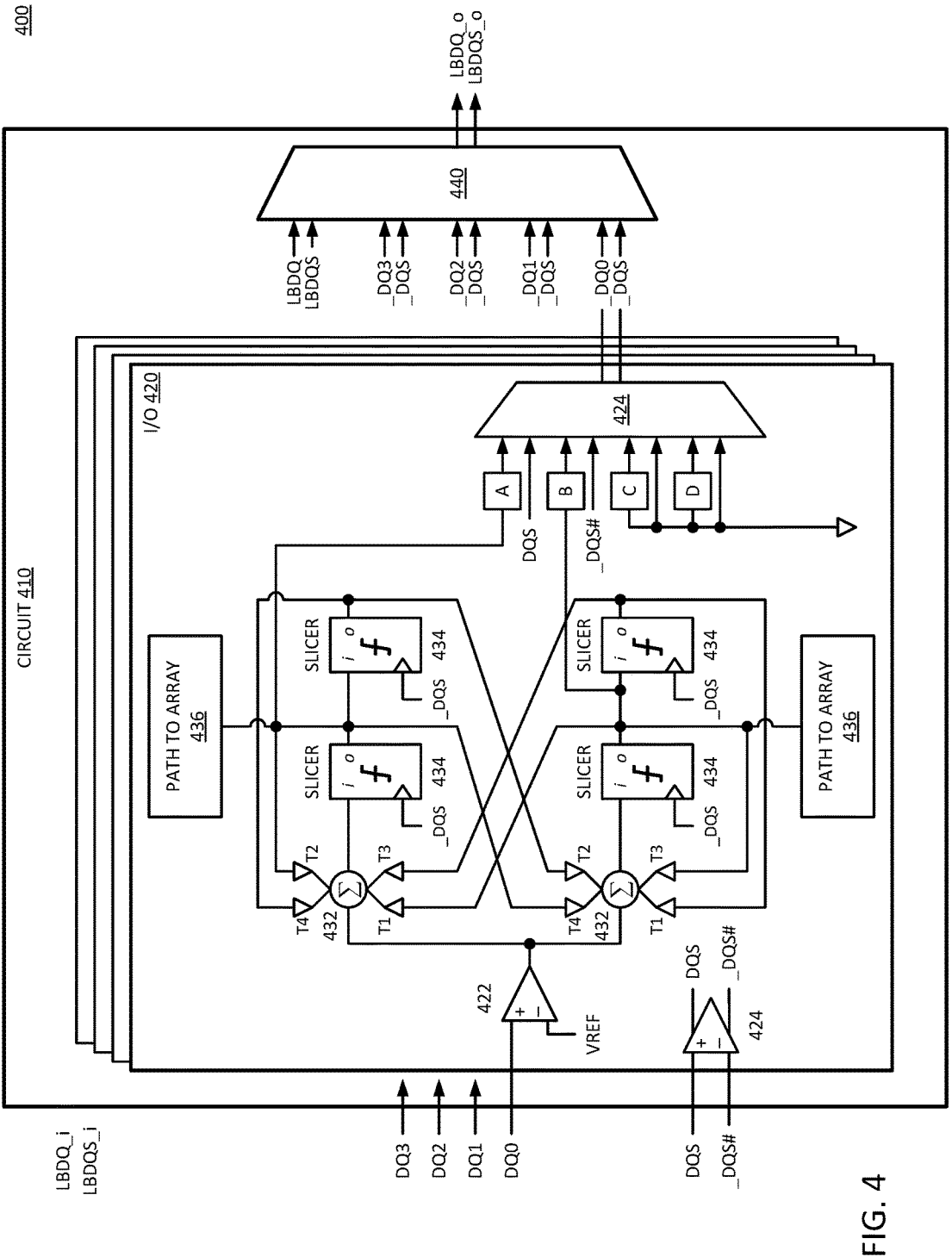
FIG. 4 is a block diagram of an example of a loopback circuit with results from a decision feedback equalization (DFE) circuit as input to a multistage multiplexer.

FIG. 4 is a block diagram of an example of a loopback circuit with results from a decision feedback equalization (DFE) circuit as input to a multistage multiplexer. System 400 provides an example of loopback logic in accordance with system 100. In an example, the I/O includes a DFE circuit, which can be implemented along with loopback. In an example, the loopback circuit includes a multistage mux on the back end of the equalization circuit or other functional blocks, or a combination, which can enable providing any phase of the DFE slicer as well as any bit of the memory device or DRAM.

An example of system 400 includes circuit 410, which represents an I/O interface circuit. Circuit 410 includes I/O circuitry 420 for a data signal (DQ). System 400 illustrates an example of logic or circuitry for DQ0, and similar logic can be understood for DQ1, DQ2, and DQ3, assuming a ×4 data bus interface. The DQS or data strobe signal can be applied to the various DQs.

In one example, I/O 420 includes receiver 422 to receive data from the signal line for DQ0. In one example, the input signal is sample against a reference signal VREF. Other circuitry not shown can include driver circuitry to transmit on DQ0. I/O 420 can also include receive circuitry 424 for DQS and_DQS #, which represents the inverted signal. I/O 420 includes path to array 426 to provide connections and circuitry to convey a data signal from DQ0 to an addressable location of the memory array. An example of I/O 420 includes equalization circuitry as illustrated. The equalization circuitry can include multiple DQ slicers 434, triggered on_DOS. Slicers 434 receive input signals at the input port, and provide output at the output port. As illustrated, the equalization circuitry includes summing circuits 432 to sum the inputs of the various slicers.

I/O 420 represents or illustrates one example of a 2-way equalization circuit, with taps T1:T4. It will be understood that a 1-way, 2-way, 4-way, or other DFE could be implemented. The equalization circuitry of I/O 420 provides an output to mux 424, which can be the first stage of a multistage mux. In the case of a 2-way equalizer, mux 424 can include more inputs than needed, for example, having sufficient inputs for a 4-way equalizer.

As illustrated, circuit 410 includes mux 440 to provide output based on selection of various inputs. More stages of mux can be used. Mux 440 can include more stages than are illustrated. For simplicity, only the circuitry for a single DQ line is illustrated. The first mux stage of mux 424 can select a DFE slice, and the second mux stage of mux 440 can select a DQ signal line. In one example, mux 440 can select from among various DQ signal line input paths and a loopback signal from a prior stage in a series of memory components.

In one example, a host device (for example, a memory controller) issues a Write command to a memory device, register, or buffer, or other memory component. In one example, the loopback circuit inside the memory device as illustrated by system 400 receives the data from the device's receivers and forwards it out to the loopback output pins (example, LPDQ_o, LPDQS_o) for consumption by an external device such as a test instrument or even the memory controller without having to issue a Read command. In one example, an external signal from another device or test instrument can be driven into the device through the loopback input pins (LBDQS_i, LBDQ_i) and forwarded directly out to the loopback output pins (LBDQS_o, LBDQ_o) for daisy chaining another loopback data from adjacent device for analysis.

In system 400, the loopback includes 2 input pins (one DQ and one single-ended DQS), 2 output pins (one DQ and one single-ended DQS), and other circuits such as multiplexers to select the loopback input. In one example, the loopback input is either one of the device's DQ pins, or the loopback output from a previous device or test instrument in a daisy chain. System 400 may require memory device programming to configure the loopback. In one example, loopback programming can include setup for loopback enable or disable and selecting the loopback input. In one example, the host can configure the memory device with mode register set commands or other configuration commands to program the desired output.

At higher data rates (for example, 3400 MT/s (mega transfers per second) or higher), the data eye at the device ball may be closed. An equalization circuit such as the equalizer of system 400 may open the data eye. System 400 I/O circuit 420 can provide one example of an implementation of a 4-Tap DFE in series with the loopback circuit. The equalizer attempts to improve the data eye of the received data. The loopback can take the output from the DFE and forward it out to the device loopback output pins for analysis. While system 400 illustrates a DFE, it will be understood that DFE is not required to implement the loopback described herein.

In one example, the loopback circuit provides a pathway to an external pin to be probed to determine if the same data written was received by the memory device. In one example, the DFE opens the data eye at the memory device pin or ball, but from the inside of the circuit, which can guarantee the proper receipt by the memory device. While both DQS and DQS # are illustrated, in one example, only DQS is used as a single-ended DQS input.

Figures 5, 6:
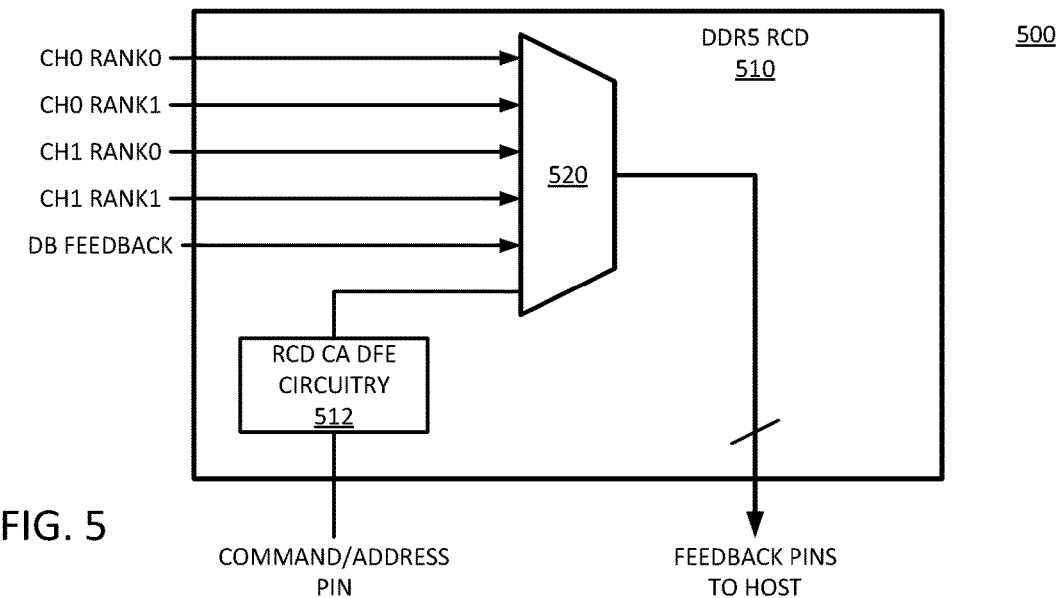
FIG. 5 is a block diagram of an example of a loopback in a memory module register device.
FIG. 6 is a representation of an example of an SDRAM bailout mapping with loopback pins.

FIG. 5 is a block diagram of an example of a loopback in a memory module register device. System 500 represents control logic for a memory module or other group of memory devices. System 500 can function with or separately from loopback logic internal to a memory device, such as what is provided above in systems 200, 300, and 400. In one example, system 500 represents or includes a memory module or DIMM loopback logic that can characterize or train a DRAM device, such as a DDR5 DRAM. In one example, system 500 can characterize or train an RCD or data buffer receivers or both in a system environment. In one example, system 500 enables the daisy chaining together of multiple devices for training signals, rather than needing to probe every DRAM location. The daisy chaining can allow for a significant pin reduction and simplification of characterization relative to traditional approaches.

In one example, system 500 illustrates an example of a loopback implementation on a register clock driver (RCD) or data buffer device, which can provide for how daisy chained signals are input to an RCD. RCD 510 can represent a DDR5 RCD, and can also represent another RCD implementation within system 500. In one example, RCD 510 controls the flow of the DRAM devices, RCD, and data buffer feedback signaling. In one example, the RCD will have control forwarding logic added with mux 520 to enable an SOC (system-on-a-chip) to select which rank or channel is to be debugged or trained along with control capability of the equalization units.

In one example, RCD 510 of system 500 includes its own DFE internally, and can expose training bits to the host. As illustrated, RCD 510 includes RCD CA DFE circuitry 512 to provide equalization to one or more command/address pins. Mux 520 can provide selection of internal DFE circuitry or the loopback signaling of various memory ranks and channels. Mux 520 provides the output to feedback pins to the host controller. The host controller can analyze the signals for timing and data integrity determinations.

FIG. 6 is a representation of an example of an SDRAM bailout mapping with loopback pins. Diagram 600 provides one example of a bailout for a memory device with loopback input and output pins. Diagram 600 can be one example of a ×4 or ×8 SDRAM ×4/×8 bailout with 4 loopback pins. Diagram 600 can be in accordance with any loopback circuit described herein, with an implementation of 4 loopback signals. An implementation with more loopback signals will also be understood. While an example is provided, it will be understood that other pinout or bailout mappings could be used. As illustrated, LBDQ_i, LBDQS_i, which respectively represent loopback DQ and DQS input pins, can be mapped to 8-L and 7-L, respectively. As illustrated, LBDQ_o, LBDQS_o, which respectively represent loopback DQ and DQS output pins, can be mapped to 2-B and 2-C, respectively.

Figure 7:
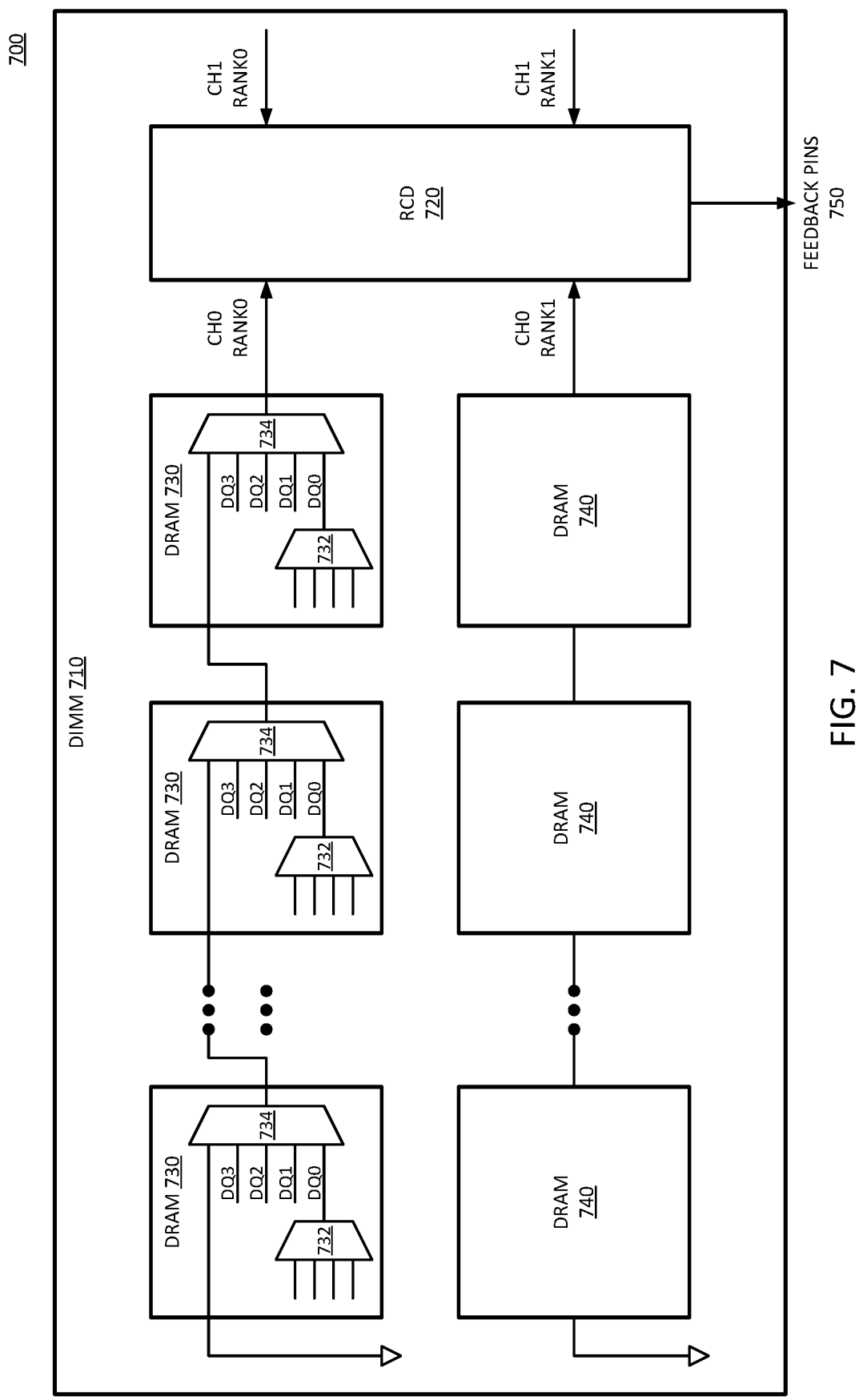
FIG. 7 is a block diagram of an example of a loopback path layout for a memory module with a register device.

FIG. 7 is a block diagram of an example of a loopback path layout for a memory module with a register device. System 700 provides an example of a system in accordance with system 100 of FIG. 1, with DIMM 710 and DRAM devices 730. As illustrated, DRAM devices 730 can be daisy chained together with a feedback path leading to an input of RCD 720. It will be understood that for simplification only half of a symmetrical DIMM is represented. It will also be understood that a physical implementation or physical layout of system 700 may vary from the logical representation provided.

In one example, a memory module loopback topology daisy chains DRAM devices 730 or data buffer loopback pins or both, which can feed back a received signal or data out to an edge connector or test point. The feedback signal can be used for testing purposes, or training purposes, or both. In one example, loopback is a way for the host (memory controller or test instrument) to immediately read back data that was written to a DRAM device 730 or data buffer without having to issue multiple write and read (WR/RD) commands. For simplicity in representation, DRAMs 730 illustrate muxes 732 to select an equalization input and muxes 734 to select a data signal line. The representations are not meant to restrict the number of inputs possible, and different implementations will be understood from what is illustrated. Feedback pins 750 represent a feedback or loopback path to the host controller (not specifically shown) from DIMM 710 and RCD 720.

In one example, DIMM 710 includes DRAMs 740, which can represent another rank on the same channel as DRAMs 730, such as Rank1 to Rank0 of DRAMs 730. DRAMs 740 are not illustrated with loopback circuits. In one example, DRAMs 740 include loopback circuits such as what is illustrated in DRAMs 730. In an alternative example, DRAMs 740 do not necessarily include loopback circuitry. A lack of loopback circuitry in DRAMs 740 may allow loopback testing of DRAMs 730 as described herein, but require different testing for DRAMs 740.

The immediate feedback can overcome inherent limitations that exist from characterizing the receiver using statistical analysis methods such as BER analysis. With a target BER of $10^{-16}$, for example, there is not enough memory depth in the DRAM to store all the data needed to provide such a BER. Additionally, the amount of time to perform multiple WR/RD commands to/from the internal memory array is prohibitively long for sufficient data to implement the target BER. Additionally, since the amount of time involved performing the operations involving accessing the memory array is much longer than the DRAM refresh rate interval, the host or memory controller would traditionally be required to manage refreshes during testing to ensure data retention, which can be avoided with direct loopback as described. Finally, limited pattern depth means limited ISI and limited Rj, and, therefore, limited error detection at the receiver. Use of the loopback feature is useful for characterizing a receiver without the limitations and complexities of traditional training methods.

Figure 8:
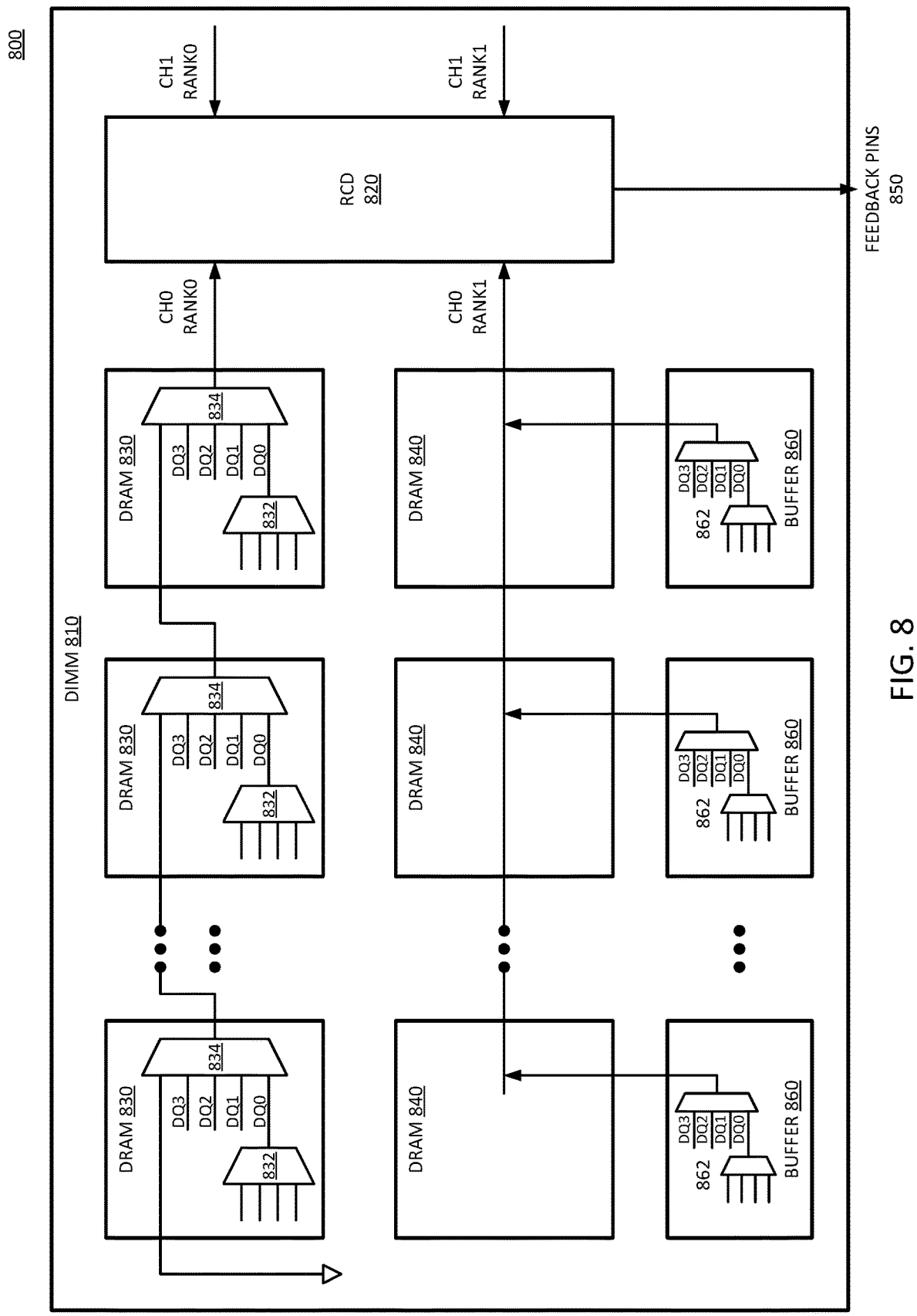
FIG. 8 is a block diagram of an example of a loopback path layout for a memory module with a register device and data buffers, which utilizes loopback through the DRAM devices.

FIG. 8 is a block diagram of an example of a loopback path layout for a memory module with a register device and data buffers, which utilizes loopback through the DRAM devices. System 800 provides an example of a system in accordance with system 100 of FIG. 1, and can provide an example of a system in accordance with an example of system 700.

DIMM 810 illustrates RCD 820, which represents a register device on DIMM 810. As illustrated, RCD 820 includes multidrop paths for different ranks of memory for different channels, with no memory devices illustrated on Channel1 for purposes of simplicity. An example of DRAMs 830 includes multistage multiplexing as illustrated by mux 832 and mux 834, similar to what is described in other examples. The arrow to RCD 820 represents a feedback path to RCD 820 to provide loopback data to RCD 820 to provide to the host controller (not specifically shown) via feedback pins 850. Feedback pins 850 represent an interface to data signal lines to convey loopback information.

In one example, DIMM 810 includes data buffer receivers 860. In one example, the data buffers include loopback circuits that can be in accordance with any example described herein, in accordance with any function accessible via the data buffer. Loopback circuits 862 of buffers 860 are illustrated the same as the loopback circuits of DRAMs 830, but are not necessarily equivalent circuits. As illustrated, system 800 can include memory components with loopback circuits. The memory components can include the memory devices, a memory module register, or a data buffer. In one example, a combination of these components can include loopback circuits.

In one example, the loopback path of a DRAM device can be used to forward the data buffer receiver data from loopback 862 to RCD 820. Thus, data buffers 860 can provide an external signal passed into a loopback circuit of DRAM device 830. In one example, the data buffer can be separate from the DRAM device, and can include a loopback circuit separate from the DRAM device. In one example of system 800, one rank of DRAMs can provide loopback data from the DRAM devices and another rank can provide loopback data from the buffer devices. In one example, a series of DRAM devices that provides loopback data from the buffer circuits can also provide loopback data for the DRAM devices.

In one example, DRAMs 840 include a loopback path for Rank1, Channel0 to RCD 820. In one example, DRAMs 840 include loopback circuits comparable to those illustrated for DRAMs 830. In one example of system 800, data buffers are used for Rank1 but not for Rank0. In one example, DRAMs 830 of Rank0 can also include buffers similar to buffers 860. In one example, DRAM 840 includes a loopback path, such as a multistage mux such as illustrated for DRAMs 830. In one implementation, the output of loopback circuits 862 of buffers 860 are inputs into the second stage mux (e.g., a mux comparable to mux 834).

In one example, system 800 includes or represents an LRDIMM (load reduced DIMM). In one example, an LRDIMM may obviate the need for a DFE in the DRAM device. In one example, implementations of an RDIMM (register DIMM) or UDIMM (unregistered DIMM) will not include a data buffer, and may need a DFE in the DRAM device to provide a sufficiently readable signal. However, an LRDIMM may provide a cleaner signal that would reduce or eliminate the need for a DFE in the DRAM device. Such configurations can include loopback whether or not DFE is included.

Figure 9:
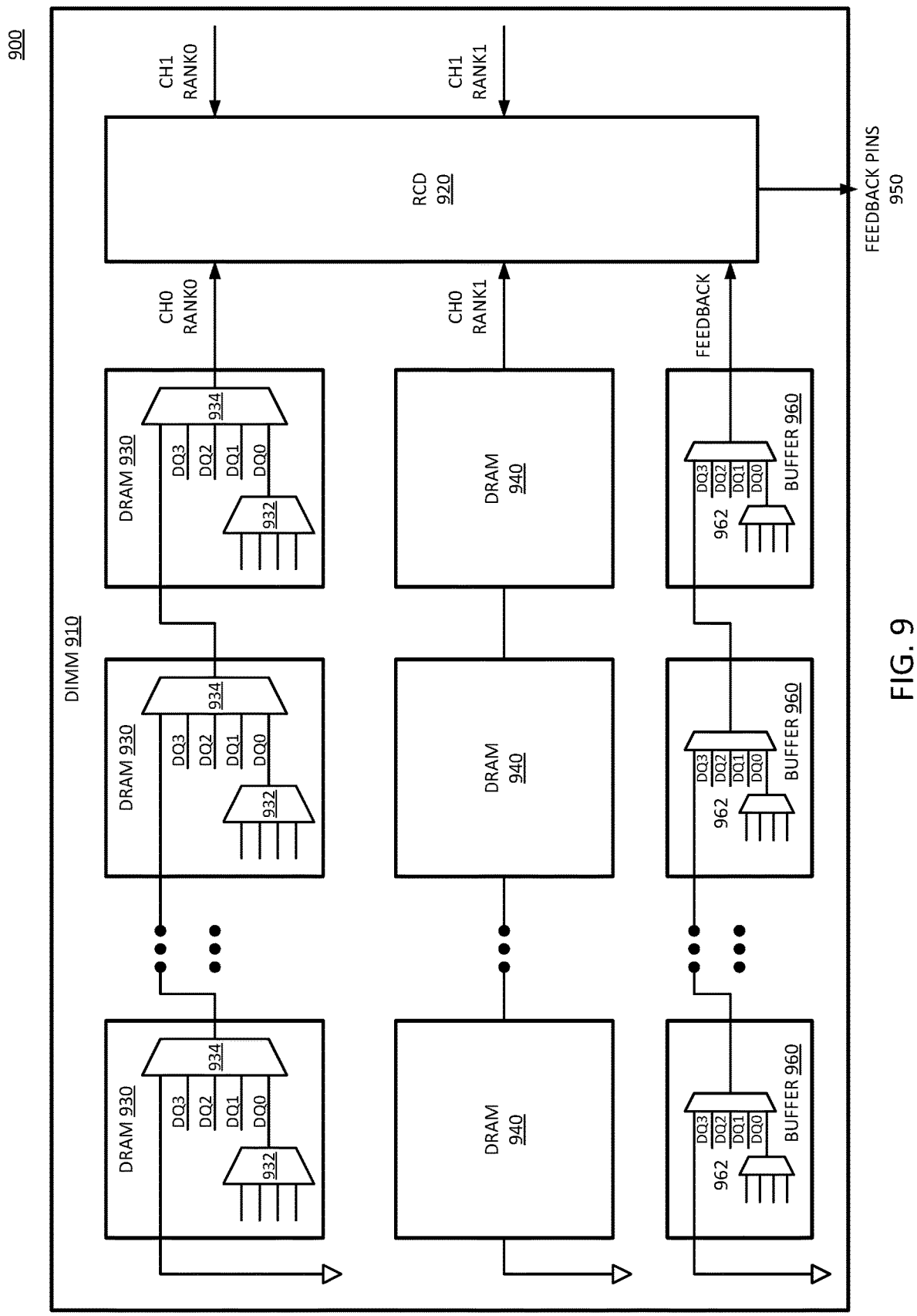
FIG. 9 is a block diagram of an example of a loopback path layout for a memory module with a register device and data buffers, which utilizes loopback through the data buffers.

FIG. 9 is a block diagram of an example of a loopback path layout for a memory module with a register device and data buffers, which utilizes loopback through the data buffers. System 900 provides one example of a system in accordance with system 100 of FIG. 1. System 900 can provide one example of a system in accordance with an example of system 700. In one example, rather than passing data buffer signals through the DRAM devices to the RCD, data buffer loopback circuits can be daisy chained directly, and provide a feedback path to the RCD. RCD 920 can interface with feedback pins 950 to a host controller (not specifically shown).

Thus, DIMM 910 can include RCD 920, with Channel0, Rank0 illustrated by DRAMs 930 that include loopback circuitry with multistage multiplexing with mux 932 and mux 934. In one example, DRAMs 940 may or may not include loopback circuits. Buffers 960 include loopback circuits 962, which can be daisy-chained together to provide a loopback path in DIMM 910 that is separate from the data paths of the various DRAM devices.

Figure 10:
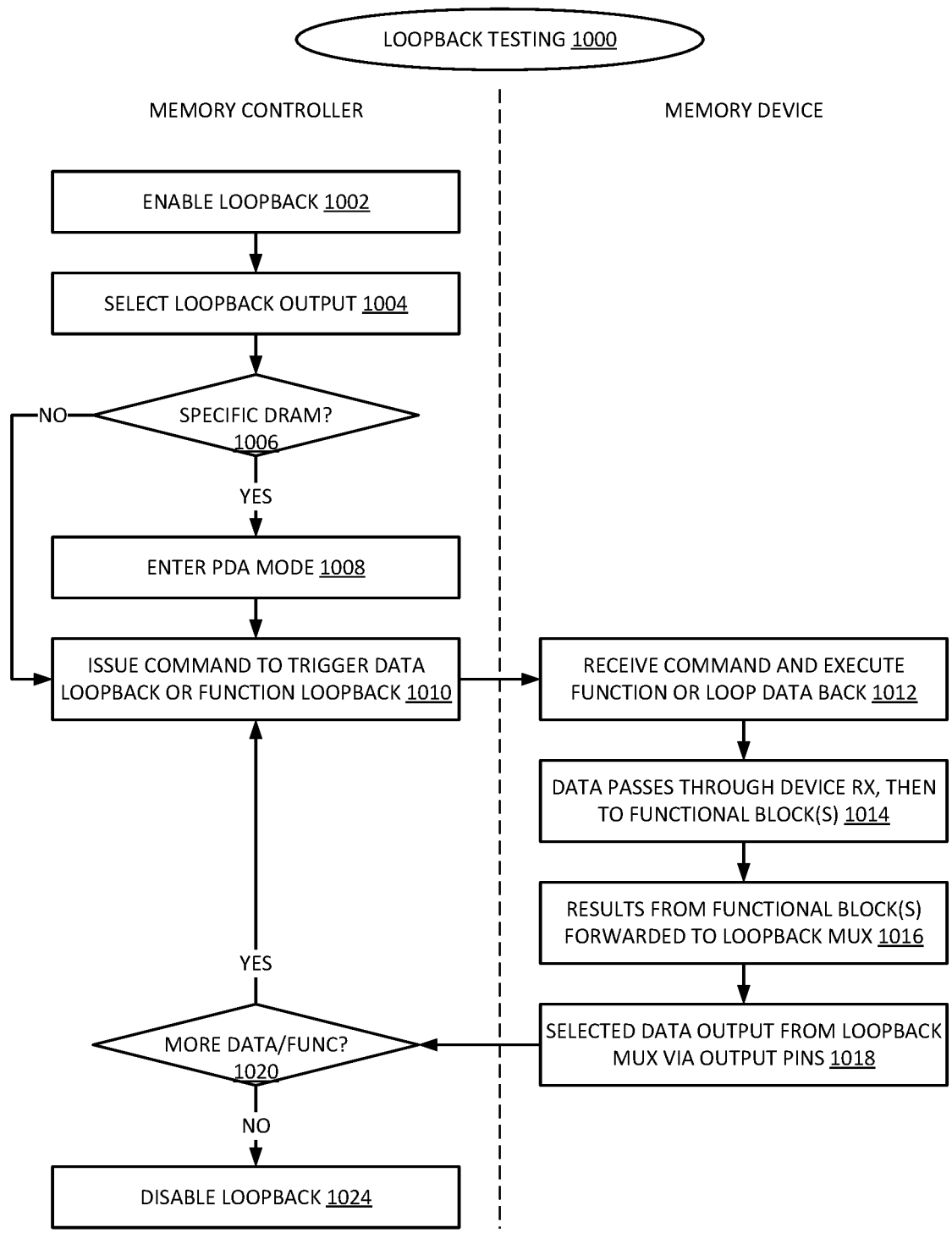
FIG. 10 is a flow diagram of an example of a process in a memory device for loopback testing.

FIG. 10 is a flow diagram of an example of a process in a memory device for loopback testing. Process 1000 provides one example of a loopback flow for loopback logic in a memory device, where the loopback can be in accordance with any example herein. In one example, a memory controller enables loopback in a memory device, 1002. In one example, the memory controller selects one or more outputs for loopback, 1004. The selection can include sending one or more commands to set selection bits for one or more muxes to select a source for loopback information.

In one example, if the command is to apply to only a specific memory device or DRAM, 1006 YES branch, the memory controller can trigger a PDA (per DRAM addressability) mode, 1008. The PDA mode enables the application of commands to a specifically addressed memory device. For certain commands or in a configuration where a single memory device is used, PDA mode may not be necessary or desired. For certain functions, the command applies to multiple memory devices to trigger the function to be observed in the loopback. In one example, the memory controller issues a command to the memory device to trigger data loopback or function loopback for training, 1010.

The memory device receives the command and executes the function or loops back the data, 1012. In one example, the data passes through a device receive (RX) path, and zero or more functional blocks, 1014. In one example, the functional block can include a DFE for the I/O of the memory device. In one example, the results from the functional blocks can be forwarded to a loopback mux, 1016. In one example, the memory device forwards the selected data from the loopback mux to a loopback output pin, 1018. In one example, the loopback output can include multiple output signal lines. The training occurs over many cycles to train the I/O for sending and receiving in accordance with desired performance. If there is more data to send or more functions or both to continue training, 1020 YES branch, the memory controller issues another command, 1010. If the training is completed, 1020 NO branch, the memory controller can disable loopback, 1024, and terminate the training.

Figure 11:
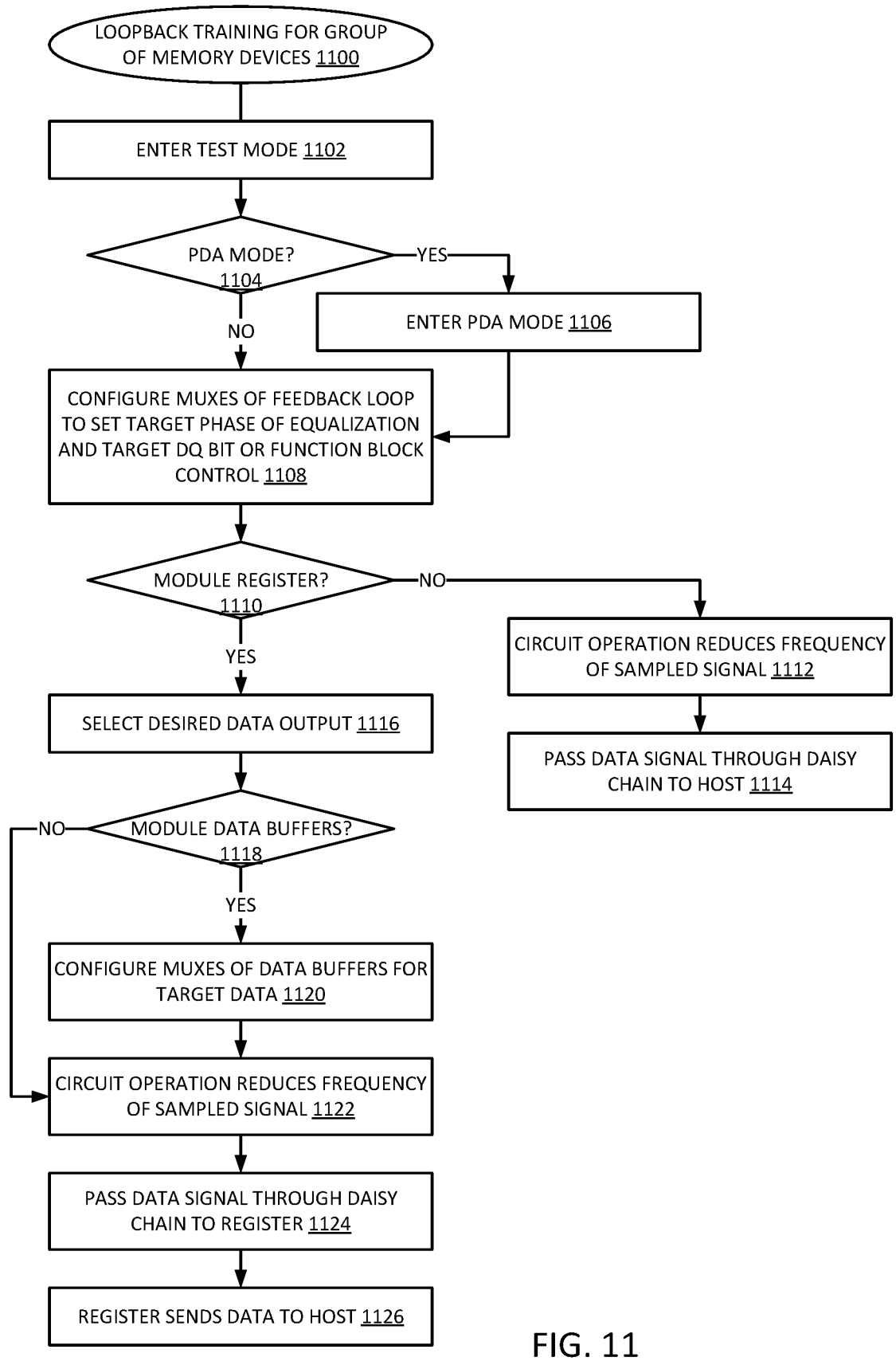
FIG. 11 is a flow diagram of an example of a process for loopback testing in a memory module.

FIG. 11 is a flow diagram of an example of a process for loopback testing in a memory module. Process 1100 illustrates one example of a data collection flow with loopback logic, which can be in accordance with any example of loopback herein for a group of memory devices. In one example, the loopback training initiates by a host (e.g., a test device or a memory controller) causing a memory device to enter a test mode, 1102. In one example, the testing will use a PDA mode, 1104 YES branch, and the host can trigger the memory to enter PDA (per DRAM accessibility) mode, 1106.

In one example, whether not in PDA mode, 1104 NO branch, or in PDA mode, the host configures multiplexers related to feedback loops of one or more DRAM devices to set target phase of equalization and target DQ bit or other function block control, 1108. In one example, the configuration can be to read a specific DQ signal line. The configuration can be to read equalization settings. In one example, the configuration can be to read one or more settings related to functions other than equalization related to I/O, such as refresh timings, termination, or other functions associated with an expected timing parameter, or a combination.

If there is a not memory module or group of collectively managed memory devices that includes a register, 1110 NO branch, in one example, the loopback circuit operation reduces the frequency of the sampled signal, 1112, and passes the data signal for the selected or configured parameter through a daisy chain to the host, 1114. Thus, in one example, the memory devices can daisy chain the signals to directly send from an end-of-chain memory device to the host.

If there is a memory module or group of collectively managed memory devices that includes a register, 1110 YES branch, in one example, the host configures the register to select the desired data output from the memory devices, the register, the data buffers, or a combination, 1116. If the memory module includes data buffers, 1118 YES branch, in one example, the host configures multiplexers of the data buffers via a per buffer addressability for the target data, 1120. In one example, the data signal can be a data loopback, or data from a monitored function of the device or buffer.

In one example, if there are no data buffers, 1118 NO branch, or if there are data buffers which have been configured, 1120, the loopback circuit operation reduces the frequency of the sampled signal, 1122. In one example, the loopback circuit passes the data signal through a daisy chain of devices (either the memory devices or the data buffers) to the register, 1124. In one example, the register sends the loopback data signal to the host, 1126.

Figure 12:
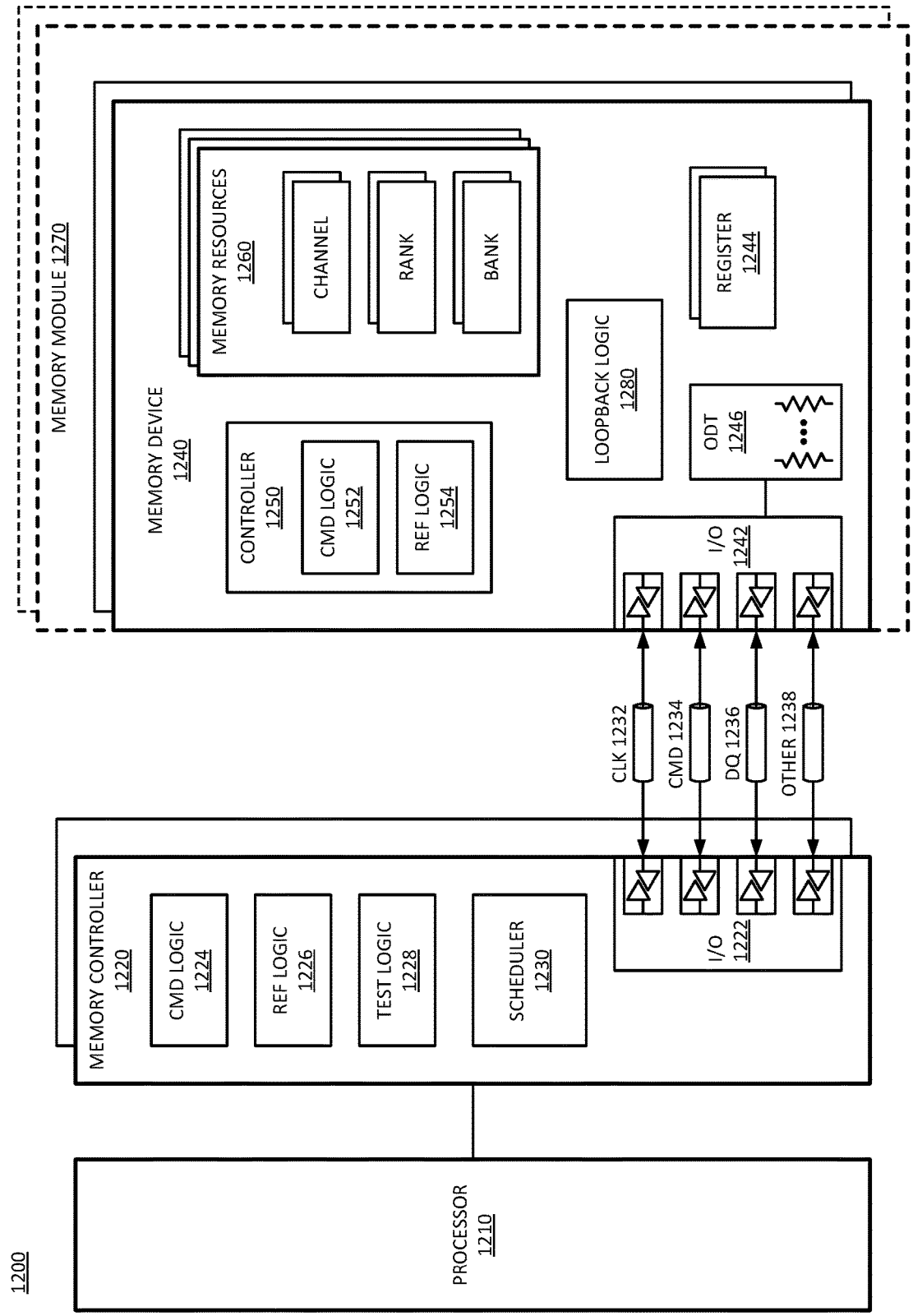
FIG. 12 is a block diagram of an example of a memory subsystem with a memory device with loopback logic.

FIG. 12 is a block diagram of an example of a memory subsystem with a memory device with loopback logic. System 1200 includes a processor and elements of a memory subsystem in a computing device. Processor 1210 represents a processing unit of a computing platform that may execute an operating system (OS) and applications, which can collectively be referred to as the host or the user of the memory. The OS and applications execute operations that result in memory accesses. Processor 1210 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Memory accesses may also be initiated by devices such as a network controller or hard disk controller. Such devices can be integrated with the processor in some systems or attached to the processer via a bus (e.g., PCI express), or a combination. System 1200 can be implemented as an SOC (system on a chip), or be implemented with standalone components.

Reference to memory devices can apply to different memory types. Memory devices often refers to volatile memory technologies. Volatile memory is memory whose state (and therefore the data stored on it) is indeterminate if power is interrupted to the device. Nonvolatile memory refers to memory whose state is determinate even if power is interrupted to the device. Dynamic volatile memory requires refreshing the data stored in the device to maintain state. One example of dynamic volatile memory includes DRAM (dynamic random access memory), or some variant such as synchronous DRAM (SDRAM). A memory subsystem as described herein may be compatible with a number of memory technologies, such as DDR4 (DDR version 4, JESD79, initial specification published in September 2012 by JEDEC), LPDDR4 (low power DDR version 4, JESD209-4, originally published by JEDEC in August 2014), WIO2 (Wide I/O 2 (WideIO2), JESD229-2, originally published by JEDEC in August 2014), HBM (high bandwidth memory DRAM, JESD235A, originally published by JEDEC in November 2015), DDR5 (DDR version 5, currently in discussion by JEDEC), LPDDR5 (currently in discussion by JEDEC), HBM2 ((HBM version 2), currently in discussion by JEDEC), or others or combinations of memory technologies, and technologies based on derivatives or extensions of such specifications.

In addition to, or alternatively to, volatile memory, in one example, reference to memory devices can refer to a nonvolatile memory device whose state is determinate even if power is interrupted to the device. In one example, the nonvolatile memory device is a block addressable memory device, such as NAND or NOR technologies. Thus, a memory device can also include a future generation nonvolatile devices, such as a three dimensional crosspoint memory device, other byte addressable nonvolatile memory devices, or memory devices that use chalcogenide phase change material (e.g., chalcogenide glass). In one example, the memory device can be or include multi-threshold level NAND flash memory, NOR flash memory, single or multi-level phase change memory (PCM) or phase change memory with a switch (PCMS), a resistive memory, nanowire memory, ferroelectric transistor random access memory (FeTRAM), magnetoresistive random access memory (MRAM) memory that incorporates memristor technology, or spin transfer torque (STT)-MRAM, or a combination of any of the above, or other memory.

Descriptions herein referring to a "RAM" or "RAM device" can apply to any memory device that allows random access, whether volatile or nonvolatile. Descriptions referring to a "DRAM" or a "DRAM device" can refer to a volatile random access memory device. The memory device or DRAM can refer to the die itself, to a packaged memory product that includes one or more dies, or both. In one example, a system with volatile memory that needs to be refreshed can also include nonvolatile memory.

Memory controller 1220 represents one or more memory controller circuits or devices for system 1200. Memory controller 1220 represents control logic that generates memory access commands in response to the execution of operations by processor 1210. Memory controller 1220 accesses one or more memory devices 1240. Memory devices 1240 can be DRAM devices in accordance with any referred to above. In one example, memory devices 1240 are organized and managed as different channels, where each channel couples to buses and signal lines that couple to multiple memory devices in parallel. Each channel is independently operable. Thus, each channel is independently accessed and controlled, and the timing, data transfer, command and address exchanges, and other operations are separate for each channel. Coupling can refer to an electrical coupling, communicative coupling, physical coupling, or a combination of these. Physical coupling can include direct contact. Electrical coupling includes an interface or interconnection that allows electrical flow between components, or allows signaling between components, or both. Communicative coupling includes connections, including wired or wireless, that enable components to exchange data.

In one example, settings for each channel are controlled by separate mode registers or other register settings. In one example, each memory controller 1220 manages a separate memory channel, although system 1200 can be configured to have multiple channels managed by a single controller, or to have multiple controllers on a single channel. In one example, memory controller 1220 is part of host processor 1210, such as logic implemented on the same die or implemented in the same package space as the processor.

Memory controller 1220 includes I/O interface logic 1222 to couple to a memory bus, such as a memory channel as referred to above. I/O interface logic 1222 (as well as I/O interface logic 1242 of memory device 1240) can include pins, pads, connectors, signal lines, traces, or wires, or other hardware to connect the devices, or a combination of these. I/O interface logic 1222 can include a hardware interface. As illustrated, I/O interface logic 1222 includes at least drivers/transceivers for signal lines. Commonly, wires within an integrated circuit interface couple with a pad, pin, or connector to interface signal lines or traces or other wires between devices. I/O interface logic 1222 can include drivers, receivers, transceivers, or termination, or other circuitry or combinations of circuitry to exchange signals on the signal lines between the devices. The exchange of signals includes at least one of transmit or receive. While shown as coupling I/O 1222 from memory controller 1220 to I/O 1242 of memory device 1240, it will be understood that in an implementation of system 1200 where groups of memory devices 1240 are accessed in parallel, multiple memory devices can include I/O interfaces to the same interface of memory controller 1220. In an implementation of system 1200 including one or more memory modules 1270, I/O 1242 can include interface hardware of the memory module in addition to interface hardware on the memory device itself. Other memory controllers 1220 will include separate interfaces to other memory devices 1240.

The bus between memory controller 1220 and memory devices 1240 can be implemented as multiple signal lines coupling memory controller 1220 to memory devices 1240. The bus may typically include at least clock (CLK) 1232, command/address (CMD) 1234, and write data (DQ) and read data (DQ) 1236, and zero or more other signal lines 1238. In one example, a bus or connection between memory controller 1220 and memory can be referred to as a memory bus. The signal lines for CMD can be referred to as a "C/A bus" (or ADD/CMD bus, or some other designation indicating the transfer of commands (C or CMD) and address (A or ADD) information) and the signal lines for write and read DQ can be referred to as a "data bus." In one example, independent channels have different clock signals, C/A buses, data buses, and other signal lines. Thus, system 1200 can be considered to have multiple "buses," in the sense that an independent interface path can be considered a separate bus. It will be understood that in addition to the lines explicitly shown, a bus can include at least one of strobe signaling lines, alert lines, auxiliary lines, or other signal lines, or a combination. It will also be understood that serial bus technologies can be used for the connection between memory controller 1220 and memory devices 1240. An example of a serial bus technology is 8B10B encoding and transmission of high-speed data with embedded clock over a single differential pair of signals in each direction. In one example, CMD 1234 represents signal lines shared in parallel with multiple memory devices. In one example, multiple memory devices share encoding command signal lines of CMD 1234, and each has a separate chip select (CS_n) signal line to select individual memory devices.

It will be understood that in the example of system 1200, the bus between memory controller 1220 and memory devices 1240 includes a subsidiary command bus CMD 1234 and a subsidiary bus to carry the write and read data, DQ 1236. In one example, the data bus can include bidirectional lines for read data and for write/command data. In another example, the subsidiary bus DQ 1236 can include unidirectional write signal lines for write and data from the host to memory, and can include unidirectional lines for read data from the memory to the host. In accordance with the chosen memory technology and system design, other signals 1238 may accompany a bus or sub bus, such as strobe lines DQS. Based on design of system 1200, or implementation if a design supports multiple implementations, the data bus can have more or less bandwidth per memory device 1240. For example, the data bus can support memory devices that have either a ×32 interface, a ×16 interface, a ×8 interface, or other interface. The convention "×W," where W is an integer that refers to an interface size or width of the interface of memory device 1240, which represents a number of signal lines to exchange data with memory controller 1220. The interface size of the memory devices is a controlling factor on how many memory devices can be used concurrently per channel in system 1200 or coupled in parallel to the same signal lines. In one example, high bandwidth memory devices, wide interface devices, or stacked memory configurations, or combinations, can enable wider interfaces, such as a ×128 interface, a ×256 interface, a ×512 interface, a ×1024 interface, or other data bus interface width.

In one example, memory devices 1240 and memory controller 1220 exchange data over the data bus in a burst, or a sequence of consecutive data transfers. The burst corresponds to a number of transfer cycles, which is related to a bus frequency. In one example, the transfer cycle can be a whole clock cycle for transfers occurring on a same clock or strobe signal edge (e.g., on the rising edge). In one example, every clock cycle, referring to a cycle of the system clock, is separated into multiple unit intervals (UIs), where each UI is a transfer cycle. For example, double data rate transfers trigger on both edges of the clock signal (e.g., rising and falling). A burst can last for a configured number of UIs, which can be a configuration stored in a register, or triggered on the fly. For example, a sequence of eight consecutive transfer periods can be considered a burst length 8 (BL8), and each memory device 1240 can transfer data on each UI. Thus, a ×8 memory device operating on BL8 can transfer 64 bits of data (8 data signal lines times 8 data bits transferred per line over the burst). It will be understood that this simple example is merely an illustration and is not limiting.

Memory devices 1240 represent memory resources for system 1200. In one example, each memory device 1240 is a separate memory die. In one example, each memory device 1240 can interface with multiple (e.g., 2) channels per device or die. Each memory device 1240 includes I/O interface logic 1242, which has a bandwidth determined by the implementation of the device (e.g., ×16 or ×8 or some other interface bandwidth). I/O interface logic 1242 enables the memory devices to interface with memory controller 1220. I/O interface logic 1242 can include a hardware interface, and can be in accordance with I/O 1222 of memory controller, but at the memory device end. In one example, multiple memory devices 1240 are connected in parallel to the same command and data buses. In another example, multiple memory devices 1240 are connected in parallel to the same command bus, and are connected to different data buses. For example, system 1200 can be configured with multiple memory devices 1240 coupled in parallel, with each memory device responding to a command, and accessing memory resources 1260 internal to each. For a Write operation, an individual memory device 1240 can write a portion of the overall data word, and for a Read operation, an individual memory device 1240 can fetch a portion of the overall data word. As non-limiting examples, a specific memory device can provide or receive, respectively, 8 bits of a 1228-bit data word for a Read or Write transaction, or 8 bits or 126 bits (depending for a ×8 or a ×16 device) of a 256-bit data word. The remaining bits of the word will be provided or received by other memory devices in parallel.

In one example, memory devices 1240 are disposed directly on a motherboard or host system platform (e.g., a PCB (printed circuit board) on which processor 1210 is disposed) of a computing device. In one example, memory devices 1240 can be organized into memory modules 1270. In one example, memory modules 1270 represent dual inline memory modules (DIMMs). In one example, memory modules 1270 represent other organization of multiple memory devices to share at least a portion of access or control circuitry, which can be a separate circuit, a separate device, or a separate board from the host system platform. Memory modules 1270 can include multiple memory devices 1240, and the memory modules can include support for multiple separate channels to the included memory devices disposed on them. In another example, memory devices 1240 may be incorporated into the same package as memory controller 1220, such as by techniques such as multi-chip-module (MCM), package-on-package, through-silicon via (TSV), or other techniques or combinations. Similarly, in one example, multiple memory devices 1240 may be incorporated into memory modules 1270, which themselves may be incorporated into the same package as memory controller 1220. It will be appreciated that for these and other implementations, memory controller 1220 may be part of host processor 1210.

Memory devices 1240 each include memory resources 1260. Memory resources 1260 represent individual arrays of memory locations or storage locations for data. Typically memory resources 1260 are managed as rows of data, accessed via wordline (rows) and bitline (individual bits within a row) control. Memory resources 1260 can be organized as separate channels, ranks, and banks of memory. Channels may refer to independent control paths to storage locations within memory devices 1240. Ranks may refer to common locations across multiple memory devices (e.g., same row addresses within different devices). Banks may refer to arrays of memory locations within a memory device 1240. In one example, banks of memory are divided into sub-banks with at least a portion of shared circuitry (e.g., drivers, signal lines, control logic) for the sub-banks, allowing separate addressing and access. It will be understood that channels, ranks, banks, sub-banks, bank groups, or other organizations of the memory locations, and combinations of the organizations, can overlap in their application to physical resources. For example, the same physical memory locations can be accessed over a specific channel as a specific bank, which can also belong to a rank. Thus, the organization of memory resources will be understood in an inclusive, rather than exclusive, manner.

In one example, memory devices 1240 include one or more registers 1244. Register 1244 represents one or more storage devices or storage locations that provide configuration or settings for the operation of the memory device. In one example, register 1244 can provide a storage location for memory device 1240 to store data for access by memory controller 1220 as part of a control or management operation. In one example, register 1244 includes one or more Mode Registers. In one example, register 1244 includes one or more multipurpose registers. The configuration of locations within register 1244 can configure memory device 1240 to operate in different "modes," where command information can trigger different operations within memory device 1240 based on the mode. Additionally or in the alternative, different modes can also trigger different operation from address information or other signal lines depending on the mode. Settings of register 1244 can indicate configuration for I/O settings (e.g., timing, termination or ODT (on-die termination) 1246, driver configuration, or other I/O settings).

In one example, memory device 1240 includes ODT 1246 as part of the interface hardware associated with I/O 1242. ODT 1246 can be configured as mentioned above, and provide settings for impedance to be applied to the interface to specified signal lines. In one example, ODT 1246 is applied to DQ signal lines. In one example, ODT 1246 is applied to command signal lines. In one example, ODT 1246 is applied to address signal lines. In one example, ODT 1246 can be applied to any combination of the preceding. The ODT settings can be changed based on whether a memory device is a selected target of an access operation or a non-target device. ODT 1246 settings can affect the timing and reflections of signaling on the terminated lines. Careful control over ODT 1246 can enable higher-speed operation with improved matching of applied impedance and loading. ODT 1246 can be applied to specific signal lines of I/O interface 1242, 1222, and is not necessarily applied to all signal lines.

Memory device 1240 includes controller 1250, which represents control logic within the memory device to control internal operations within the memory device. For example, controller 1250 decodes commands sent by memory controller 1220 and generates internal operations to execute or satisfy the commands. Controller 1250 can be referred to as an internal controller, and is separate from memory controller 1220 of the host. Controller 1250 can determine what mode is selected based on register 1244, and configure the internal execution of operations for access to memory resources 1260 or other operations based on the selected mode. Controller 1250 generates control signals to control the routing of bits within memory device 1240 to provide a proper interface for the selected mode and direct a command to the proper memory locations or addresses. Controller 1250 includes command logic 1252, which can decode command encoding received on command and address signal lines. Thus, command logic 1252 can be or include a command decoder. With command logic 1252, memory device can identify commands and generate internal operations to execute requested commands.

Referring again to memory controller 1220, memory controller 1220 includes command (CMD) logic 1224, which represents logic or circuitry to generate commands to send to memory devices 1240. The generation of the commands can refer to the command prior to scheduling, or the preparation of queued commands ready to be sent. Generally, the signaling in memory subsystems includes address information within or accompanying the command to indicate or select one or more memory locations where the memory devices should execute the command. In response to scheduling of transactions for memory device 1240, memory controller 1220 can issue commands via I/O 1222 to cause memory device 1240 to execute the commands. In one example, controller 1250 of memory device 1240 receives and decodes command and address information received via I/O 1242 from memory controller 1220. Based on the received command and address information, controller 1250 can control the timing of operations of the logic and circuitry within memory device 1240 to execute the commands. Controller 1250 is responsible for compliance with standards or specifications within memory device 1240, such as timing and signaling requirements. Memory controller 1220 can implement compliance with standards or specifications by access scheduling and control.

Memory controller 1220 includes scheduler 1230, which represents logic or circuitry to generate and order transactions to send to memory device 1240. From one perspective, the primary function of memory controller 1220 could be said to schedule memory access and other transactions to memory device 1240. Such scheduling can include generating the transactions themselves to implement the requests for data by processor 1210 and to maintain integrity of the data (e.g., such as with commands related to refresh). Transactions can include one or more commands, and result in the transfer of commands or data or both over one or multiple timing cycles such as clock cycles or unit intervals. Transactions can be for access such as read or write or related commands or a combination, and other transactions can include memory management commands for configuration, settings, data integrity, or other commands or a combination.

Memory controller 1220 typically includes logic such as scheduler 1230 to allow selection and ordering of transactions to improve performance of system 1200. Thus, memory controller 1220 can select which of the outstanding transactions should be sent to memory device 1240 in which order, which is typically achieved with logic much more complex that a simple first-in first-out algorithm. Memory controller 1220 manages the transmission of the transactions to memory device 1240, and manages the timing associated with the transaction. In one example, transactions have deterministic timing, which can be managed by memory controller 1220 and used in determining how to schedule the transactions with scheduler 1230.

In one example, memory controller 1220 includes refresh (REF) logic 1226. Refresh logic 1226 can be used for memory resources that are volatile and need to be refreshed to retain a deterministic state. In one example, refresh logic 1226 indicates a location for refresh, and a type of refresh to perform. Refresh logic 1226 can trigger self-refresh within memory device 1240, or execute external refreshes which can be referred to as auto refresh commands) by sending refresh commands, or a combination. In one example, system 1200 supports all bank refreshes as well as per bank refreshes. All bank refreshes cause the refreshing of banks within all memory devices 1240 coupled in parallel. Per bank refreshes cause the refreshing of a specified bank within a specified memory device 1240. In one example, controller 1250 within memory device 1240 includes refresh logic 1254 to apply refresh within memory device 1240. In one example, refresh logic 1254 generates internal operations to perform refresh in accordance with an external refresh received from memory controller 1220. Refresh logic 1254 can determine if a refresh is directed to memory device 1240, and what memory resources 1260 to refresh in response to the command.

In one example, memory controller 1220 includes test logic 1228, which represents logic in the memory controller to train I/O in system 1200. Namely, test logic 1228 provides sequences of transactions to memory device 1240 to enable memory device 1240 to test receiving signals at I/O 1242 in accordance with different settings. I/O 1242 can be operated in accordance with various settings, which can be set with registers local to I/O 1242, or with mode registers, or with a combination of mode registers and local registers. In one example, the loopback training can include sequences of transactions with settings for different phase settings for the signaling, which can include voltage settings, current settings, termination settings, phase compensation (e.g., delay locked loops) settings, or other settings, or a combination of multiple different types of settings. The transactions can allow the iteration of I/O with different settings or combinations of settings to find settings that can meet an expected bit error rate (BER).

In one example, memory device 1240 includes loopback logic 1280, which can include logic at the memory devices themselves, or at memory module 1270, or a combination. Loopback logic 1280 enables memory device 1240 or memory module 1270 or both to pass training data back to test logic 1228 or to pass back testing results, or both. Loopback logic 1280 can enable the training of I/O 1242 without having to store data to the memory arrays of memory resources 1260. Thus, loopback logic 1280 can enable faster training, as well as training for improved BER.

Figure 13:
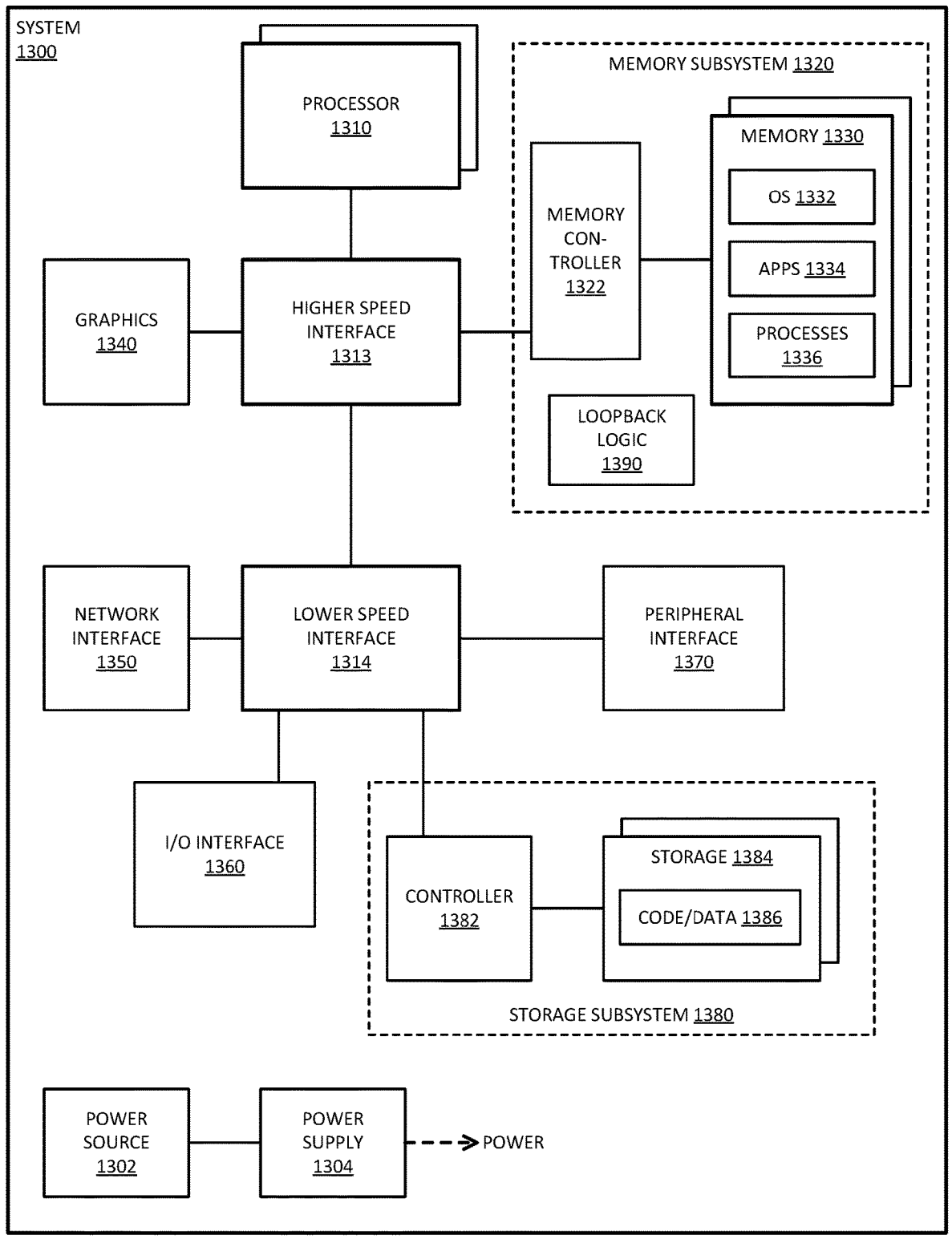
FIG. 13 is a block diagram of an example of a computing system in which memory device loopback testing can be implemented.

FIG. 13 is a block diagram of an example of a computing system in which memory device loopback testing can be implemented. System 1300 represents a computing device in accordance with any example herein, and can be a laptop computer, a desktop computer, a tablet computer, a server, a gaming or entertainment control system, a scanner, copier, printer, routing or switching device, embedded computing device, a smartphone, a wearable device, an internet-of-things device or other electronic device.

System 1300 includes processor 1310, which provides processing, operation management, and execution of instructions for system 1300. Processor 1310 can include any type of microprocessor, central processing unit (CPU), graphics processing unit (GPU), processing core, or other processing hardware to provide processing for system 1300, or a combination of processors. Processor 1310 controls the overall operation of system 1300, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 1300 includes interface 1312 coupled to processor 1310, which can represent a higher speed interface or a high throughput interface for system components that needs higher bandwidth connections, such as memory subsystem 1320 or graphics interface components 1340. Interface 1312 represents an interface circuit, which can be a standalone component or integrated onto a processor die. Where present, graphics interface 1340 interfaces to graphics components for providing a visual display to a user of system 1300. In one example, graphics interface 1340 can drive a high definition (HD) display that provides an output to a user. High definition can refer to a display having a pixel density of approximately 100 PPI (pixels per inch) or greater, and can include formats such as full HD (e.g., 1080 p), retina displays, 4K (ultra high definition or UHD), or others. In one example, the display can include a touchscreen display. In one example, graphics interface 1340 generates a display based on data stored in memory 1330 or based on operations executed by processor 1310 or both. In one example, graphics interface 1340 generates a display based on data stored in memory 1330 or based on operations executed by processor 1310 or both.

Memory subsystem 1320 represents the main memory of system 1300, and provides storage for code to be executed by processor 1310, or data values to be used in executing a routine. Memory subsystem 1320 can include one or more memory devices 1330 such as read-only memory (ROM), flash memory, one or more varieties of random access memory (RAM) such as DRAM, or other memory devices, or a combination of such devices. Memory 1330 stores and hosts, among other things, operating system (OS) 1332 to provide a software platform for execution of instructions in system 1300. Additionally, applications 1334 can execute on the software platform of OS 1332 from memory 1330. Applications 1334 represent programs that have their own operational logic to perform execution of one or more functions. Processes 1336 represent agents or routines that provide auxiliary functions to OS 1332 or one or more applications 1334 or a combination. OS 1332, applications 1334, and processes 1336 provide software logic to provide functions for system 1300. In one example, memory subsystem 1320 includes memory controller 1322, which is a memory controller to generate and issue commands to memory 1330. It will be understood that memory controller 1322 could be a physical part of processor 1310 or a physical part of interface 1312. For example, memory controller 1322 can be an integrated memory controller, integrated onto a circuit with processor 1310.

While not specifically illustrated, it will be understood that system 1300 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus.

In one example, system 1300 includes interface 1314, which can be coupled to interface 1312. Interface 1314 can be a lower speed interface than interface 1312. In one example, interface 1314 represents an interface circuit, which can include standalone components and integrated circuitry. In one example, multiple user interface components or peripheral components, or both, couple to interface 1314. Network interface 1350 provides system 1300 the ability to communicate with remote devices (e.g., servers or other computing devices) over one or more networks. Network interface 1350 can include an Ethernet adapter, wireless interconnection components, cellular network interconnection components, USB (universal serial bus), or other wired or wireless standards-based or proprietary interfaces. Network interface 1350 can exchange data with a remote device, which can include sending data stored in memory or receiving data to be stored in memory.

In one example, system 1300 includes one or more input/output (I/O) interface(s) 1360. I/O interface 1360 can include one or more interface components through which a user interacts with system 1300 (e.g., audio, alphanumeric, tactile/touch, or other interfacing). Peripheral interface 1370 can include any hardware interface not specifically mentioned above. Peripherals refer generally to devices that connect dependently to system 1300. A dependent connection is one where system 1300 provides the software platform or hardware platform or both on which operation executes, and with which a user interacts.

In one example, system 1300 includes storage subsystem 1380 to store data in a nonvolatile manner. In one example, in certain system implementations, at least certain components of storage 1380 can overlap with components of memory subsystem 1320. Storage subsystem 1380 includes storage device(s) 1384, which can be or include any conventional medium for storing large amounts of data in a nonvolatile manner, such as one or more magnetic, solid state, or optical based disks, or a combination. Storage 1384 holds code or instructions and data 1386 in a persistent state (i.e., the value is retained despite interruption of power to system 1300). Storage 1384 can be generically considered to be a "memory," although memory 1330 is typically the executing or operating memory to provide instructions to processor 1310. Whereas storage 1384 is nonvolatile, memory 1330 can include volatile memory (i.e., the value or state of the data is indeterminate if power is interrupted to system 1300). In one example, storage subsystem 1380 includes controller 1382 to interface with storage 1384. In one example controller 1382 is a physical part of interface 1314 or processor 1310, or can include circuits or logic in both processor 1310 and interface 1314.

Power source 1302 provides power to the components of system 1300. More specifically, power source 1302 typically interfaces to one or multiple power supplies 1304 in system 1302 to provide power to the components of system 1300. In one example, power supply 1304 includes an AC to DC (alternating current to direct current) adapter to plug into a wall outlet. Such AC power can be renewable energy (e.g., solar power) power source 1302. In one example, power source 1302 includes a DC power source, such as an external AC to DC converter. In one example, power source 1302 or power supply 1304 includes wireless charging hardware to charge via proximity to a charging field. In one example, power source 1302 can include an internal battery or fuel cell source.

In one example, memory subsystem 1320 includes loopback logic 1390, which represents loopback logic in accordance with any example herein. Loopback logic 1390 includes logic, which can include circuitry, to enable the memory device to pass signals back to a host in response to a write command without having to write data to the memory array, or to read the data from the memory array. The loopback function can include configuration of memory 1330, and the generation of transactions by memory controller 1322 or a test device (not specifically shown). In one example, memory 1330 is placed in a loopback mode to perform the loopback functions.

Figure 14:
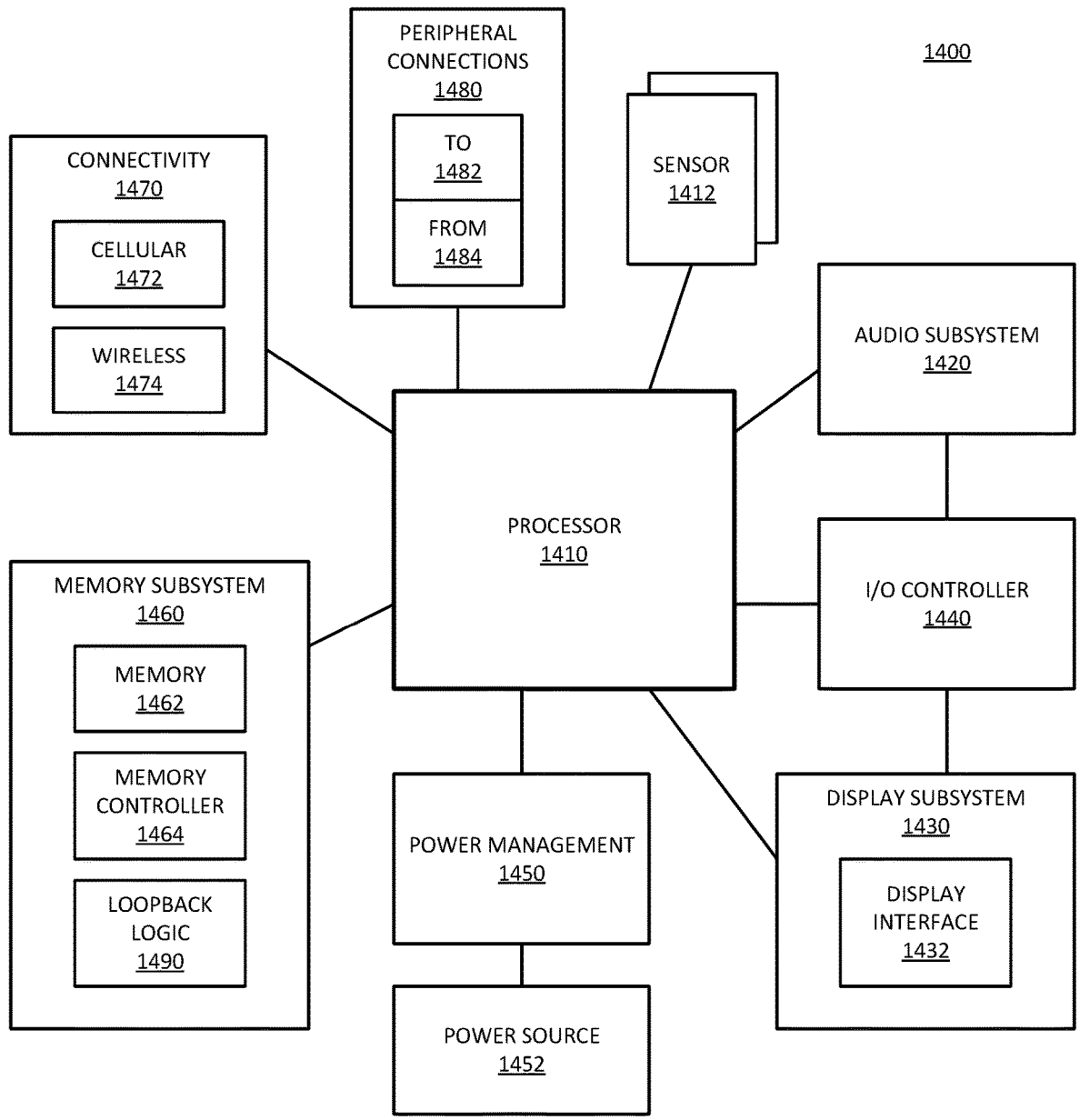
FIG. 14 is a block diagram of an example of a mobile device in which memory device loopback testing can be implemented.

FIG. 14 is a block diagram of an example of a mobile device in which memory device loopback testing can be implemented. Device 1400 represents a mobile computing device, such as a computing tablet, a mobile phone or smartphone, a wireless-enabled e-reader, wearable computing device, an internet-of-things device or other mobile device, or an embedded computing device. It will be understood that certain of the components are shown generally, and not all components of such a device are shown in device 1400.

Device 1400 includes processor 1410, which performs the primary processing operations of device 1400. Processor 1410 can include one or more physical devices, such as microprocessors, application processors, microcontrollers, programmable logic devices, or other processing means. The processing operations performed by processor 1410 include the execution of an operating platform or operating system on which applications and device functions are executed. The processing operations include operations related to I/O (input/output) with a human user or with other devices, operations related to power management, operations related to connecting device 1400 to another device, or a combination. The processing operations can also include operations related to audio I/O, display I/O, or other interfacing, or a combination. Processor 1410 can execute data stored in memory. Processor 1410 can write or edit data stored in memory.

In one example, system 1400 includes one or more sensors 1412. Sensors 1412 represent embedded sensors or interfaces to external sensors, or a combination. Sensors 1412 enable system 1400 to monitor or detect one or more conditions of an environment or a device in which system 1400 is implemented. Sensors 1412 can include environmental sensors (such as temperature sensors, motion detectors, light detectors, cameras, chemical sensors (e.g., carbon monoxide, carbon dioxide, or other chemical sensors)), pressure sensors, accelerometers, gyroscopes, medical or physiology sensors (e.g., biosensors, heart rate monitors, or other sensors to detect physiological attributes), or other sensors, or a combination. Sensors 1412 can also include sensors for biometric systems such as fingerprint recognition systems, face detection or recognition systems, or other systems that detect or recognize user features. Sensors 1412 should be understood broadly, and not limiting on the many different types of sensors that could be implemented with system 1400. In one example, one or more sensors 1412 couples to processor 1410 via a frontend circuit integrated with processor 1410. In one example, one or more sensors 1412 couples to processor 1410 via another component of system 1400.

In one example, device 1400 includes audio subsystem 1420, which represents hardware (e.g., audio hardware and audio circuits) and software (e.g., drivers, codecs) components associated with providing audio functions to the computing device. Audio functions can include speaker or headphone output, as well as microphone input. Devices for such functions can be integrated into device 1400, or connected to device 1400. In one example, a user interacts with device 1400 by providing audio commands that are received and processed by processor 1410.

Display subsystem 1430 represents hardware (e.g., display devices) and software components (e.g., drivers) that provide a visual display for presentation to a user. In one example, the display includes tactile components or touchscreen elements for a user to interact with the computing device. Display subsystem 1430 includes display interface 1432, which includes the particular screen or hardware device used to provide a display to a user. In one example, display interface 1432 includes logic separate from processor 1410 (such as a graphics processor) to perform at least some processing related to the display. In one example, display subsystem 1430 includes a touchscreen device that provides both output and input to a user. In one example, display subsystem 1430 includes a high definition (HD) display that provides an output to a user. High definition can refer to a display having a pixel density of approximately 100 PPI (pixels per inch) or greater, and can include formats such as full HD (e.g., 1080 p), retina displays, 4K (ultra high definition or UHD), or others. In one example, display subsystem includes a touchscreen display. In one example, display subsystem 1430 generates display information based on data stored in memory or based on operations executed by processor 1410 or both.

I/O controller 1440 represents hardware devices and software components related to interaction with a user. I/O controller 1440 can operate to manage hardware that is part of audio subsystem 1420, or display subsystem 1430, or both. Additionally, I/O controller 1440 illustrates a connection point for additional devices that connect to device 1400 through which a user might interact with the system. For example, devices that can be attached to device 1400 might include microphone devices, speaker or stereo systems, video systems or other display device, keyboard or keypad devices, or other I/O devices for use with specific applications such as card readers or other devices.

As mentioned above, I/O controller 1440 can interact with audio subsystem 1420 or display subsystem 1430 or both. For example, input through a microphone or other audio device can provide input or commands for one or more applications or functions of device 1400. Additionally, audio output can be provided instead of or in addition to display output. In another example, if display subsystem includes a touchscreen, the display device also acts as an input device, which can be at least partially managed by I/O controller 1440. There can also be additional buttons or switches on device 1400 to provide I/O functions managed by I/O controller 1440.

In one example, I/O controller 1440 manages devices such as accelerometers, cameras, light sensors or other environmental sensors, gyroscopes, global positioning system (GPS), or other hardware that can be included in device 1400, or sensors 1412. The input can be part of direct user interaction, as well as providing environmental input to the system to influence its operations (such as filtering for noise, adjusting displays for brightness detection, applying a flash for a camera, or other features).

In one example, device 1400 includes power management 1450 that manages battery power usage, charging of the battery, and features related to power saving operation. Power management 1450 manages power from power source 1452, which provides power to the components of system 1400. In one example, power source 1452 includes an AC to DC (alternating current to direct current) adapter to plug into a wall outlet. Such AC power can be renewable energy (e.g., solar power, motion based power). In one example, power source 1452 includes only DC power, which can be provided by a DC power source, such as an external AC to DC converter. In one example, power source 1452 includes wireless charging hardware to charge via proximity to a charging field. In one example, power source 1452 can include an internal battery or fuel cell source.

Memory subsystem 1460 includes memory device(s) 1462 for storing information in device 1400. Memory subsystem 1460 can include nonvolatile (state does not change if power to the memory device is interrupted) or volatile (state is indeterminate if power to the memory device is interrupted) memory devices, or a combination. Memory 1460 can store application data, user data, music, photos, documents, or other data, as well as system data (whether long-term or temporary) related to the execution of the applications and functions of system 1400. In one example, memory subsystem 1460 includes memory controller 1464 (which could also be considered part of the control of system 1400, and could potentially be considered part of processor 1410). Memory controller 1464 includes a scheduler to generate and issue commands to control access to memory device 1462.

Connectivity 1470 includes hardware devices (e.g., wireless or wired connectors and communication hardware, or a combination of wired and wireless hardware) and software components (e.g., drivers, protocol stacks) to enable device 1400 to communicate with external devices. The external device could be separate devices, such as other computing devices, wireless access points or base stations, as well as peripherals such as headsets, printers, or other devices. In one example, system 1400 exchanges data with an external device for storage in memory or for display on a display device. The exchanged data can include data to be stored in memory, or data already stored in memory, to read, write, or edit data.

Connectivity 1470 can include multiple different types of connectivity. To generalize, device 1400 is illustrated with cellular connectivity 1472 and wireless connectivity 1474. Cellular connectivity 1472 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 1474 refers to wireless connectivity that is not cellular, and can include personal area networks (such as Bluetooth), local area networks (such as WiFi), or wide area networks (such as WiMax), or other wireless communication, or a combination. Wireless communication refers to transfer of data through the use of modulated electromagnetic radiation through a non-solid medium. Wired communication occurs through a solid communication medium.

Peripheral connections 1480 include hardware interfaces and connectors, as well as software components (e.g., drivers, protocol stacks) to make peripheral connections. It will be understood that device 1400 could both be a peripheral device ("to" 1482) to other computing devices, as well as have peripheral devices ("from" 1484) connected to it. Device 1400 commonly has a "docking" connector to connect to other computing devices for purposes such as managing (e.g., downloading, uploading, changing, synchronizing) content on device 1400. Additionally, a docking connector can allow device 1400 to connect to certain peripherals that allow device 1400 to control content output, for example, to audiovisual or other systems.

In addition to a proprietary docking connector or other proprietary connection hardware, device 1400 can make peripheral connections 1480 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), or other type.

In one example, memory subsystem 1460 includes loopback logic 1490, which represents loopback logic in accordance with any example herein. Loopback logic 1490 includes logic, which can include circuitry, to enable the memory device to pass signals back to a host in response to a write command without having to write data to the memory array, or to read the data from the memory array. The loopback function can include configuration of memory 1462, and the generation of transactions by memory controller 1464 or a test device (not specifically shown). In one example, memory 1462 is placed in a loopback mode to perform the loopback functions.

In one aspect, a host controller device includes: a hardware data interface to signal lines to provide data to a memory component; and a hardware loopback interface to a loopback path of the memory component, wherein the loopback path is to provide loopback data back to the host controller device in response to receipt of the data of the data interface, wherein the loopback data includes data not stored in or retrieved from a memory array coupled to the memory component.

In one aspect, a system with a memory subsystem includes: a memory component including loopback circuitry; and a host controller device including a hardware data interface to signal lines to provide data to a memory component; and a hardware loopback interface to a loopback path of the memory component, wherein the loopback path is to provide loopback data back to the host controller device in response to receipt of the data of the data interface, wherein the loopback data includes data not stored in or retrieved from a memory array coupled to the memory component.

In one aspect, memory system input/output (I/O) circuit includes: an interface to a memory array; a hardware data interface to signal lines to receive data from a host controller; and loopback circuitry to provide loopback data back to the host controller in response to receipt of the data of the data interface, wherein the loopback data includes data not stored in or retrieved from the memory array.

In one aspect, a system with a memory subsystem includes: a memory controller; and multiple dynamic random access memory (DRAM) devices, wherein a DRAM device includes a memory component including an interface to a memory array; a hardware data interface to signal lines to receive data from a host controller; and loopback circuitry to provide loopback data back to the host controller in response to receipt of the data of the data interface, wherein the loopback data includes data not stored in or retrieved from a memory array coupled to the memory I/O circuit.

In one example, the host controller device comprises a memory controller. In one example, the host controller device comprises a controller of a test system. In one example, the memory component comprises a memory device. In one example, the memory device comprises a dynamic random access memory (DRAM) device compatible with a double data rate version 5 (DDR5) standard. In one example, the memory component comprises a memory module register. In one example, the memory component comprises a data buffer of a memory module. In one example, the memory component comprises an equalization circuit, and wherein the loopback interface is to couple to an output of the equalization circuit. In one example, the equalization circuit comprises a decision feedback equalization (DFE) circuit. In one example, the data interface comprises a data bus, and wherein the output of the equalization circuit comprises an additional signal path to the host controller device, the host controller device further comprising logic to analyze the loopback data for receive accuracy of the data. In one example, the data interface comprises a data bus, and wherein the output of the equalization circuit comprises an additional signal path to the host controller device, the host controller device further comprising logic to analyze timing of the non-data signal with respect to receipt of the data. In one example, the non-data signal comprises an on-die termination signal. In one example, the non-data signal comprises an internal write enable signal. In one example, the non-data signal comprises an internal refresh command signal. In one example, further comprising: a flash memory device to store a basic input/output system (BIOS); wherein the BIOS is to control the host controller to provide data to the memory component and analyze loopback data from the memory component. In one example, further comprising one or more of: at least one processor communicatively coupled to the host controller; a display communicatively coupled to at least one processor; a network interface communicatively coupled to at least one processor; or a battery to power the system.

Flow diagrams as illustrated herein provide examples of sequences of various process actions. The flow diagrams can indicate operations to be executed by a software or firmware routine, as well as physical operations. A flow diagram can illustrate an example of the implementation of states of a finite state machine (FSM), which can be implemented in hardware and/or software. Although shown in a particular sequence or order, unless otherwise specified, the order of the actions can be modified. Thus, the illustrated diagrams should be understood only as examples, and the process can be performed in a different order, and some actions can be performed in parallel. Additionally, one or more actions can be omitted; thus, not all implementations will perform all actions.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to what is disclosed and implementations of the invention without departing from their scope. Therefore, the illustrations and examples herein should be construed in an illustrative, and not a restrictive sense. The scope of the invention should be measured solely by reference to the claims that follow.

What is claimed is:
1. A memory device comprising:
an input/output (I/O) interface to receive data from a controller over bidirectional data signal lines;
a loopback data output pin separate from the data signal lines;
a mode register to store a value to indicate which of the data signal lines to output to the loopback data output pin; and
circuitry to:
in response to receipt of the data from the controller, provide loopback data via a loopback data path to the loopback data output pin, the loopback data to include the data received over one of the data signal lines based on the value in the mode register.

2. The memory device of claim 1, wherein:
the loopback data path is separate from a path to an array of the memory device.

3. The memory device of claim 1, wherein:
the circuitry is to: provide the loopback data to the loopback data output pin without performance of a read operation.

4. The memory device of claim 1, wherein:
the controller comprises a memory controller or a controller of a test system.

5. The memory device of claim 1, wherein:
the loopback data output pin is to couple with the controller.

6. The memory device of claim 1, wherein:
the loopback data output pin is to couple with an input pin of a second memory device.

7. The memory device of claim 1, further comprising:
a loopback data strobe pin.

8. The memory device of claim 1, wherein:
the circuitry is to provide the loopback data during training of the memory device.

9. The memory device of claim 1, wherein:
the circuitry is to select one of multiple different phases of the one of the data signal lines to be output via the loopback data output pin.

10. A memory module comprising:
a plurality of memory devices, each of the plurality of memory devices comprising:
an input/output (I/O) interface to receive data from a controller over bidirectional data signal lines;
a loopback data output pin separate from the data signal lines;
a mode register to store a value to indicate which of the data signal lines to output to the loopback data output pin; and
circuitry to:
in response to receipt of the data from the controller, provide loopback data via a loopback data path to the loopback data output pin, the loopback data to include the data received over one of the data signal lines based on the value in the mode register.

11. The memory module of claim 10, wherein:
the loopback data path is separate from a path to an array of the memory device.

12. The memory module of claim 10, wherein:
the circuitry is to: provide the loopback data to the loopback data output pin without performance of a read operation.

13. The memory module of claim 10, wherein:
the controller comprises a memory controller or a controller of a test system.

14. The memory module of claim 10, wherein:
the loopback data output pin is to couple with the controller.

15. The memory module of claim 10, wherein:
the loopback data output pin is to couple with an input pin of a second memory device.

16. The memory module of claim 10, further comprising:
a loopback data strobe pin.

17. The memory module of claim 10, wherein:
the circuitry is to provide the loopback data during training of the memory devices.

18. The memory module of claim 10, wherein:
the circuitry is to select one of multiple different phases of the one of the data signal lines to be output via the loopback data output pin.

19. The memory module of claim 10, wherein:
the memory module comprises a dual inline memory module (DIMM).

20. A system comprising:
a memory controller; and
a memory device coupled with the memory controller, the memory device comprising:
an input/output (I/O) interface to receive data from a controller over bidirectional data signal lines;
a loopback data output pin separate from the data signal lines;
a mode register to store a value to indicate which of the data signal lines to output to the loopback data output pin; and
circuitry to:
in response to receipt of the data from the controller, provide loopback data via a loopback data path to the loopback data output pin, the loopback data to include the data received over one of the data signal lines based on the value in the mode register.

21. The system of claim 20, wherein:
the controller is to:
receive the loopback data and,
evaluate the loopback data for one or more of: signal integrity, and
relative timing of receipt of the loopback data relative to transmission of a command.

* * * * *